(12) United States Patent
Wolf et al.

(10) Patent No.: US 10,572,638 B2
(45) Date of Patent: Feb. 25, 2020

(54) MOBILE TERMINAL FOR CAPTURING BIOMETRIC DATA

(71) Applicant: BUNDESDRUCKEREI GMBH, Berlin (DE)

(72) Inventors: Andreas Wolf, Jena (DE); Joachim Kueter, Berlin (DE)

(73) Assignee: BUNDESDRUCKEREI GMBH, Berlin (DE)

(*) Notice: Subject to any disclaimer, the term of this patent is extended or adjusted under 35 U.S.C. 154(b) by 1 day.

(21) Appl. No.: 14/795,941

(22) Filed: Jul. 10, 2015

(65) Prior Publication Data

US 2016/0012217 A1 Jan. 14, 2016

(30) Foreign Application Priority Data

Jul. 10, 2014 (DE) .................. 10 2014 109 682

(51) Int. Cl.
*G06F 21/32* (2013.01)
*G06F 3/0484* (2013.01)
(Continued)

(52) U.S. Cl.
CPC .......... *G06F 21/32* (2013.01); *G06F 3/04842* (2013.01); *G06K 9/00013* (2013.01);
(Continued)

(58) Field of Classification Search
CPC ..... H04L 9/3236; H04L 9/0861; G06F 21/32; G06F 3/04842; G06K 9/00013; G06K 9/00892; H04N 5/2256; H04N 5/23229
See application file for complete search history.

(56) References Cited

U.S. PATENT DOCUMENTS 2,308,725 A * 1/1943 Steiner .................. G03B 9/70
                                                                    396/183
8,296,573 B2   10/2012 Bolle et al.
(Continued)

FOREIGN PATENT DOCUMENTS

CN            1628318 A      6/2005
KR       2002 0092522      12/2002
(Continued)

OTHER PUBLICATIONS

NPL Search (Google Scholar) (Year: 2019).*
(Continued)

*Primary Examiner* — Samson B Lemma
*Assistant Examiner* — Richard W Cruz-Franqui
(74) *Attorney, Agent, or Firm* — Harness, Dickey & Pierce, P.L.C.

(57) ABSTRACT

A mobile terminal is provided by an issuing authority for capturing biometric data of a user for transmission to a security document. The mobile terminal includes a data storage unit containing a credential, an authentication module, a sensor for capturing the biometric data of the user and a control unit that is configured to capture the biometric data of the user only upon successful reciprocal authentication of the user and the mobile terminal. An authenticity test module tests the authenticity of the captured biometric data captured. If authentic, the captured biometric data is stored in the data storage unit in protected form. Readout of the biometric data from the mobile terminal, by an operator of the issuing authority, is permitted only if the operator has been authenticated to the mobile terminal using additional authentication data.

20 Claims, 7 Drawing Sheets

(51) Int. Cl.
*G06K 9/00* (2006.01)
*H04N 5/225* (2006.01)
*H04N 5/232* (2006.01)

(52) U.S. Cl.
CPC ....... *G06K 9/00892* (2013.01); *H04N 5/2256* (2013.01); *H04N 5/23229* (2013.01)

(56) References Cited

U.S. PATENT DOCUMENTS

| | | | | |
|---|---|---|---|---|
| 2001/0025342 | A1* | 9/2001 | Uchida | H04L 9/3231 713/186 |
| 2003/0073064 | A1* | 4/2003 | Riggs | G09B 5/00 434/350 |
| 2003/0234286 | A1* | 12/2003 | Labrec | B41M 3/14 235/380 |
| 2003/0235425 | A1* | 12/2003 | Iseki | G03G 15/5066 399/80 |
| 2007/0050618 | A1* | 3/2007 | Roux | H04L 9/321 713/155 |
| 2008/0052778 | A1* | 2/2008 | Narusawa | H04L 9/3231 726/19 |
| 2008/0087720 | A1 | 4/2008 | Levitov | |
| 2008/0243393 | A1* | 10/2008 | Yamamoto | A61B 5/02416 702/19 |
| 2010/0252061 | A1* | 10/2010 | Samain | A61K 8/69 132/200 |
| 2011/0186397 | A1* | 8/2011 | Sheikh | A45C 13/00 190/120 |
| 2011/0285841 | A1* | 11/2011 | Matsuda | G01B 11/2545 348/92 |
| 2012/0229700 | A1* | 9/2012 | Hsiung | H04M 1/0264 348/371 |
| 2012/0293642 | A1 | 11/2012 | Berini et al. | |
| 2013/0065564 | A1* | 3/2013 | Conner | G06K 19/0718 455/414.1 |
| 2014/0032691 | A1* | 1/2014 | Barton | H04L 41/00 709/206 |
| 2014/0070917 | A1* | 3/2014 | Protopapas | B60R 25/25 340/3.1 |
| 2014/0113593 | A1* | 4/2014 | Zhou | H04L 63/20 455/411 |
| 2014/0253780 | A1* | 9/2014 | Shih | G01J 1/4204 348/335 |
| 2014/0331297 | A1* | 11/2014 | Innes | H04L 63/08 726/7 |
| 2014/0365782 | A1* | 12/2014 | Beatson | G06F 21/32 713/186 |
| 2016/0012279 | A1* | 1/2016 | Bludau | G06K 9/00255 348/77 |

FOREIGN PATENT DOCUMENTS

| | | |
|---|---|---|
| KR | 2003 0002954 | 1/2003 |
| KR | 2003 0020152 | 3/2003 |

OTHER PUBLICATIONS

Speed Identity: "Speed Capture G3", Jan. 1, 2011 <URL:www.speed-identity.com/Files.aspx?f_id=96619>.

Inkript: "Prime Mobile Enrollment Kits", Mar. 1, 2014 <URL:http://www.inkript.com/Enrollment.aspx?pageid=44>.

Stefan Pahmeier, "Designing a self-service terminal for capturing biometric data for the German Identity Card and the Electronic Passport", Sep. 1, 2011, pp. 151-163 <URL:http://subs.emis.de/LNI/Proceedings/Proceedings191/151.pdf>.

Vision Box, "vb e-pass portable Vision-Box", Jan. 14, 2013 <URL:https://web.archive.org/web/20130114081022/http://www.vision-box.com/solutions/mobile-vbepass/>.

Inkript, "Prime Enrollment Software", Mar. 1, 2014 <URL:http://www.inkript.com/Enrollment.aspx?pageid=44>.

Chinese Office Action dated Jul. 19, 2019 in Chinese Application No. 201510401631.9.

* cited by examiner

MOBILE TERMINAL FOR CAPTURING BIOMETRIC DATA

PRIORITY CLAIM

This application claims benefit of foreign priority in accordance with 35 U.S.C. 119(b) to German application No. 10 2014 109 682.7 filed on Jul. 10, 2014.

BACKGROUND

The disclosure relates to a mobile terminal for capturing the biometric data of a user and a corresponding method.

Various methods for capturing the biometric data of a user are known in prior art, for example, for the purpose of issuing an electronic passport or a company ID that is intended to contain the biometric data. For this purpose, a government agency or an organization issuing the identification document is provided with equipment in the offices of the government agency or the issuing organization that is operated by specifically trained personnel.

In contrast, the disclosure is based on the objective of providing an improved method and an improved terminal for capturing biometric data.

BRIEF DESCRIPTION OF THE DRAWINGS

In the following, embodiments of the disclosure are explained in further detail by referring to the drawings. Shown are.

DESCRIPTION

Figure 1:
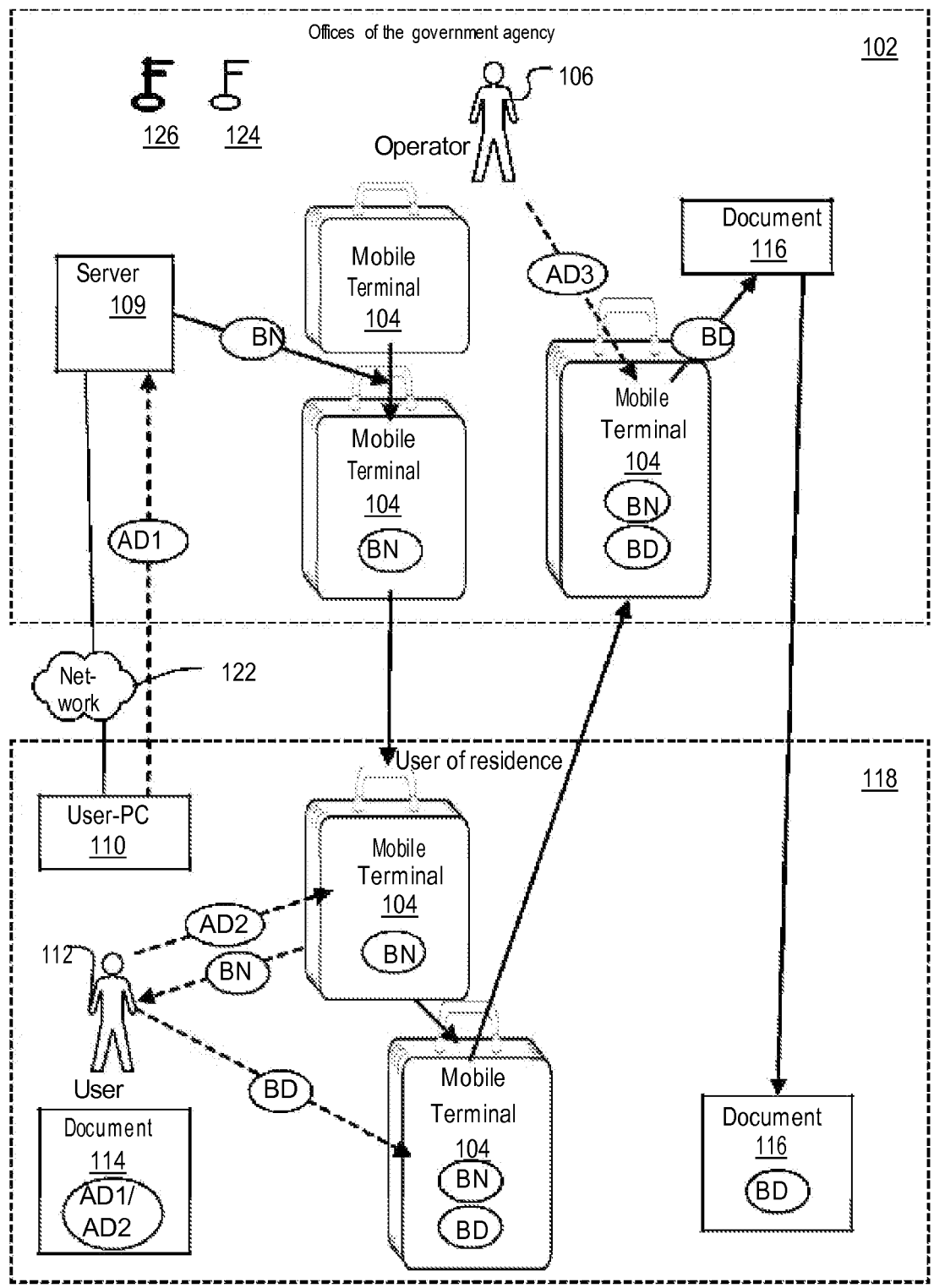
FIG. 1 shows a block diagram of the procedure for "home enrollment".

The objectives on which the disclosure is based are solved by the features of the independent patent claims respectively. Embodiments of the disclosure are indicated in the dependent claims. The embodiments cited in the following are freely combinable with each other unless they reciprocally preclude themselves.

A "security document" is a document that has one or several security features that are intended to make duplication and/or falsification of the security document more difficult or impossible, and which are stored, engrained or physically combined with the document in another way. The information stored in the security document can include, for example, the following data: a name, a birthdate, a birth place, a place of residence, a nationality, a body size, gender and biometric data of the person to whom the security document is attributed. The biometric data can include, for example, a passport picture, a fingerprint data, iris information, facial information, etc. In addition to this personal data, a security document can also include information that identifies the security document itself, for example, an identification card number and characteristic security features. A security document can, for example, be a payment means, e.g. a credit card or an identification document. For example, an identification document can be a passport, a personal identification card, an identification card, a driver's license, an employee ID card, etc.

A "terminal" is an end user device for receiving and displaying data. A terminal can contain a contactless or a contact interface to the data exchange with a security document.

"Authentication of a first entity with respect to a second entity means that proof of an asserted property of the first entity is produced relative to the second entity. The first and/or second identity can, for example, be a person, a device, a document or a data object. Here, the term "authentication", as it is customarily used in the English language, shall include providing the proof by the first entity as well as the testing of this proof by the second entity. Data values that serve as such proof in the course of authentication are described in the following as "authentication data".

"Biometric data" is data that can be used by means of automatic identification methods for personal identification. For example, biometric data can include the following data pertaining to a person: body size, eye color, finger line image, facial geometry, patterns of the iris or retina, structure of lines in the hand, patterns of the veins in the hand, nailbed patterns, tooth impressions, voice profile, signature and DNA (genetic fingerprint).

A "credential" identifies an entity as being authorized to perform a certain function. For example, a credential is a sentence of one or more data values that specifies which personal data, e.g. biometric data may be captured from a user by a mobile terminal. Beyond that, a credential can also specify which data may be read out from a security document, e.g. an electronic personal identity card, for example, so that the holder of the electronic personal identity card can authenticate himself by means of the eID (electronic identification) function of the identification card with respect to a service or a terminal. A credential can thus make a reciprocal authentication of user and service provider or user and terminal possible.

A credential can be designed as an "authorization certificate" or comprise such. An authorization certificate is an electronic certification, for example, in the form of a file that is tested by the chip of the security document (e.g. personal identification card) prior to each read operation. It can specify which personal and identification-related data the service provider or a terminal of this provider may read out from the personal identification card of the user. In Germany, for example, in order to be able to obtain an authorization certificate, a service provider, e.g. an issuer of a personalized security document may need an authorization form from an office of the government that issues authorization certificates (VfB) in the Federal Office of Administration. Service providers that want to use the online identification function (eID function) of the new personal identification card can identify themselves to the user with an authorization certificate.

One aspect of the disclosure relates to a mobile terminal for capturing the biometric data of a user. The terminal includes a data storage unit, and authentication module and a sensor for capturing the biometric data of the user. The data storage unit contains a credential that is specifically attributed to the user. The credential identifies the mobile terminal as being authorized to capture and store the biometric data of the user.

The authentication module is configured to authenticate the user to the mobile terminal by means of authentication data attributed to the user. Moreover, the authentication module is configured to authenticate the mobile terminal to the user by means of the stored credential. Further, the authentication module is configured to authenticate an operator to the mobile terminal by means of additional authentication data that is attributed to the operator.

Moreover, the terminal includes a control unit and a test unit. The control unit is configured to capture the biometric data of the user by using the sensor automatically or semi automatically only upon a successful reciprocal authentication of the user and the mobile terminal. The test unit is configured for automatic testing of the authenticity of the biometric data captured.

The control unit is configured in such a way that the biometric data captured is saved in the data storage unit in protected form only then, when the biometric data captured is authentic according to the test performed by the test unit. Furthermore, the control unit is configured to allow any readout of the protected, stored, biometric data only in the case of a successful authentication of the operator to the terminal, in order to transmit the biometric data that was read out to a security document.

The use of such a mobile terminal can be advantageous, as the trustworthiness of the biometric data obtained in this way can be very high, and this is the case without having to provide an expensive enrollment infrastructure on both sides. It is neither required that the government agencies set up corresponding enrollment terminals in their offices and train their own personnel in the often complex operation of expensive and complicated devices, nor is the user, whose biometric data is to be captured, required to make a trip to the offices of the government agency. Thus, neither side wastes any time on scheduling and traveling. Especially in rural areas or in countries with badly developed infrastructure and/or long distances to the next government office, this can be very advantageous for the user and also, in particular, for smaller branch offices of government agencies that are not required to maintain the necessary technical infrastructure or have the required technical know-how available for capturing the biometric data by means of terminals. The use of the described mobile terminal can be particularly advantageous in those situations, in which the user is immobile, e.g. for reasons of health, age or because of incarceration. In the event the user is working in a foreign country, travelling to domestic territory solely for the purpose of the secure and—from the perspective of the government agency—trustworthy capturing of the biometric data, can mean a disproportionately high expense.

According so some embodiments, the mobile terminal is designed in such a way that it evaluates the credential and activates and uses only those sensors to capture biometric data for which the terminal is authorized to collect data according to the specification of the credential.

According to some embodiments, the authentication of the terminal with respect to the user is accomplished thereby, that in the course of the personalization of the terminal, an authorization certificate is stored in the memory of the mobile terminal. The authorization certificate can specify that by means of this authorization certificate, a terminal is authorized to read out the descriptive data of the user from other, still valid identification documents of the user and/or is authorized to also read out biometric data of a certain type, or to capture and store such anew. Here, personalization of the terminal means the preparation of the terminal for shipment to this specific user for a selective capture of biometric data only from this user. The authorization certificate can be tested by a chip of the still valid personal identification card or passport of the user by means of an eID server. The mobile terminal can be configured in such a way that the method for capturing the biometric data will be continued only then—and those sensors of the terminals that capture the biometric data specified in the certificate are activated only then—when the terminal was able to identify itself as authorized with respect to the user ("authenticate").

According to embodiments, the authentication of the user with respect to the terminal is accomplished with the help of another, still valid security document, e.g. by means of a still valid personal identification card. For example, this can be accomplished thereby, that in the personalization of the mobile terminal, personal data of the user are stored in the terminal as reference values by an operator or document issuer. The reference values can, for example, include the name and address of the user that has requested that the mobile terminal be shipped for the purpose of the (new) issuance of a security document by the document issuer. After an authentication of the terminal with respect to the user's still valid security documents, the terminal can read out the users personal data from this security document and compare such with the stored reference values. When the data that was compared agrees (e.g. address and name of the user) the user has successfully authenticated himself/herself to the terminal and proven that the person that has received the personalized terminal is also that person for whom the terminal has been personalized. It is also possible that in the course of the personalization, an arbitrary reference value is stored in the mobile terminal, e.g. a random number. This arbitrary reference value is sent to the user separately, for example, by letter, by SMS, by encrypted mail or the like. Upon starting up the mobile terminal, the user can then enter this reference value, for example, by using a keyboard of the terminal in order to authenticate himself/herself to the terminal.

The circumstance that the mobile terminal can comprise the cited authentication module can be advantageous as it could thereby be prevented that a third party "foists" a manipulated terminal upon the user in order to spy out the user's biometric data. The mobile terminal can capture, store and—after being sent back to the government agency—make available the biometric data only then, when the user and the terminal have successfully authenticated each other. The protected, e.g. encrypted storage of the biometric data in the terminal could further increase the security of the data, perhaps, in order to protect the data from access by third parties in the event the mobile terminal should be lost by the postal service while being shipped back. Thus, by means of these steps the user can trust that his/her biometric data are protected even when the terminal is being transported by regular mail, and trust that the terminal actually originated only from this trustworthy document issuer and that the biometric data can be read only by such. On the other hand, it can also be ensured that the government agency can rely upon the correct attribution and the authenticity of the captured biometric data. This can be ensured thereby that the user must also authenticate himself/herself to the terminal prior to the data capture and by means of the test unit—depending on the type of the biometric data captured (fingerprint, facial image, veins in the hand, etc.)—implements a suitable test procedure to protect from "presentation attacks". For example, the testing method could include a test as to whether the captured facial image comes from a photograph that was held before a sensor, or whether the fingerprint data comes from a finger mockup consisting of alginate. Thus, even the government agency that provides the mobile terminal could be sure that the biometric data captured is that of the person that requested the terminal even without requiring the presence of personnel specifically trained to capture data (protection from "presentation attacks").

According to embodiments, the sensor consists of a camera system for capturing image date as biometric data. For example, the image data can be image data of the user's face and/or image data from an iris of the user. The camera system can consist of a single camera or of several cameras, for example, of a camera for white light images, e. g. facial images and of a camera for images that are taken in the near infrared range (NIR), e.g. iris images. Additionally or alternatively, the sensor can consist of a fingerprint sensor or include such. The fingerprint sensor serves to capture the user's fingerprint data as the biometric data. Additionally or alternatively, the sensor can consist of a sensor for vein patterns in the hand and/or retina patterns and/or nailbed patterns and/or a signature pad and/or a microphone for capturing a voice profile and/or other types of biometric sensors or include such. Even combinations of one or several of the sensors cited here are possible. A sensor for vein patterns in the hand can, for example, be an infrared camera.

Corresponding methods for data capture are described in the following Korean patent applications, for example: KR102003020152A: "SYSTEM AND METHOD FOR RECOGNIZING BLOOD VESSEL PATTERN ON BACK OF HAND FOR IDENTIFYING PERSON", KR102003002954A: "DEVICE AND METHOD FOR RECOGNIZING BLOOD VESSEL PATTERN ON BACK OF HAND FOR PERSONAL IDENTIFICATION" and KR102002092522A: "METHOD AND APPARATUS FOR IDENTIFYING PERSON BY USING FINGERPRINT OF FINGER JOINT".

This can be advantageous, because each of these biometric features and, in particular, a combination of several of the cited biometric features, allow for a very safe and reliable identification of the person that is the source of the aforementioned biometric features.

According to embodiments, the mobile terminal further includes a quality test module for automatic testing of the quality of the biometric data captured. The storage of the biometric data captured in the mobile terminal takes place only then, when the biometric data captured also meets predefined minimum quality requirements. This can be advantageous because this can prevent that due to operator error, for example, biometric data is captured and sent to the government agency together with the mobile terminal that is of insufficient quality to equip an identification document with such, for example. An expensive and time-consuming new application, the sending and returning of the mobile terminal could thereby be avoided. As the test unit performs the testing and preferably issues a warning message that enables the user to correct the operator error, the previous requirement of the presence of technically trained personnel during the enrollment process can be eliminated.

For example, the quality test can include a test of the image data to the effect as to whether the background is monotone, whether the face is sufficiently bright and evenly illuminated, whether the face in the picture appears to be of sufficient size and resolution, whether finger lines have a sufficient contrast, etc. The quality test can also include that the terminal selects one or more of a number of images of biometric data captured, for example, from several facial images or fingerprint scans and selectively only stores the selected images that have the highest quality and satisfy the minimum quality requirements. The quality assessment of the biometric data of the user can be performed, for example, according to a method disclosed in the German patent application, DE 10 2006 005 617 ("A method to assess the quality of an image [ . . . ]"). Hereby, among other things, the following parameters can be evaluated: file size, color space, color depth, brightness, contrast, dynamics, sharpness, image height, image weight, image aspect ratio, noise, number of objects shown in the image, number of eyes, eye distance, head position, ratio of width of head to image width or image height, etc.

According to embodiments, the quality module can be interoperable with an illumination unit. In the event the quality testing module determines that the quality of the images is bad because light is reflected on the eye glasses, the quality testing module can automatically change the strength and/or position and/or alignment of the illumination unit in such a way that the reflection is reduced in future pictures, or avoided entirely.

According to embodiments, the mobile terminal has the shape of a suitcase and has at least one carrying handle, a bottom part and a cover part.

Here, a suitcase very generally means a container that can be opened having dimensions and weight that are designed in such a way that it can be transported by an adult person, i.e. preferably it has dimensions of a maximum of 60 cm×60 cm×120 cm and a weight of at a maximum 31.5 kg. According to some embodiments, the mobile terminal has dimensions of a maximum of 56 cm×45 cm×25 cm and a maximum weight of 31.5 kg.

According to embodiments, the sensor includes a camera system that can be attached to the inner side of the cover part. Additionally or alternatively, the sensor includes a fingerprint sensor that can be attached on the inner side of the bottom part. Additionally or alternatively, the cover part includes a display unit on its inner side. It is for displaying operating messages for the user while biometric data are being captured. The cited features can be advantageous because the dimensions and shape of a suitcase provide comfortable portability. By attaching the camera system to the cover part, the camera can, if applicable, be positioned in such a way that the face of a person sitting on a chair in front of a table is captured roughly speaking, when the suitcase is on the table in open position.

According to embodiments, the suitcase-shaped terminal has a narrow side and a longitudinal side, whereby the longitudinal side is longer than the narrow side. The cover part and the bottom part are preferable connected rotatable with each other on the narrow side. This can make it possible that when the cover of a terminal that is located on a table is opened, even large persons sitting on a chair in front of this table can be captured by the camera.

According to embodiments, the cover part includes a semi-transparent mirror in addition to the camera system. The semi-transparent mirror can be aligned automatically and/or manually in such a way that the semi-transparent mirror is positioned between the user and the camera system. The semi-transparent mirror is aligned in such a way that on the side of the semi-transparent mirror that is facing the user the light path of the light impinging upon the semi-transparent mirror is parallel to the light path of that part of the light that is reflected back by the semi-transparent mirror. This can be advantageous as the light reflected by the semi-transparent mirror is thereby directed in the direction of the face of the user to the extent the light rays impinging upon the mirror emanate from the face of the user. The reflected rays can give the user feedback as to whether he/she is positioned at the correct distance to the light inlet aperture of the camera and/or whether his/her face is positioned at the correct height. For example, the user can identify the correct positioning of the light inlet thereby, that he/she looks "directly into his/her eyes" of the mirror image generated by the semi-transparent mirror.

Preferably, the semi-transparent mirror thereby covers the camera system and is of a sufficient size, for example, at least 5 cm×5 cm, so that its light reflection gives the user a feedback signal about the camera picture that is to be expected. The semi-transparent mirror can also contain a position marking, e.g. a rectangular frame whose size and position is coordinated with the optics of the camera system in such a way that light rays passing the semi-transparent mirror within this position marking, are captured by the camera system. These captured light rays can also contain the biometric data, e.g. a facial image of the user, light rays passing the semi-transparent mirror outside of this position marking, however, are not captured by the camera system. Correspondingly, the relevant position of the reflected rays can also provide feedback to the user inside and outside of the position marking about which parts of his/her face would presently be captured as biometric data in the event the user would, for example, activate the button of the camera system.

According to embodiments, the mobile terminal further includes a first and a second mirror configuration that is located—at the side of the semi-transparent mirror facing away from the person in such a way that the part of the light falling on the second mirror configuration through the semi-transparent mirror is directed through the second mirror configuration onto the first mirror configuration, whereby the first mirror configuration is located in such a way that this part of the transmitted light directed to the first mirror configuration is reflected to the camera system, whereby the position of the light inlet for the camera system is coupled to the position of the semi-transparent mirror. The use of such a first and second mirror configuration can be advantageous, as the light path can be lengthened within the terminal. The rerouting of the light path can make a positioning of the camera system in the lower part of the open cover part possible which in turn can make a smaller size of the cover part possible and thus a more compact design of the terminal overall. Further, a longer light path can be advantageous as thereby, the field of the depth of sharpness can be enlarged which can improve the image quality. Moreover, by means of elongating the light path between the camera lens and the face of the user, distortion effects can be prevented or at least reduced. Distortion effects in the facial image ("bulb nose effect" in photo booths) can lower the quality of the pictures and influence the performance of the biometric methods.

The use of mirror configurations can further have the advantage that the camera can be mounted in any alignment relative to the user, i.e. also pointing downward, for example, so that any soiling of the camera can be avoided.

According to embodiments, the first mirror configuration and/or the second mirror configuration are located displaceable parallel to the light path of the part of the light transmitted by the semi-transparent mirror between the first mirror configuration and the second mirror configuration. This can be advantageous as, for example, the second mirror configuration can be coupled to the light inlet of the camera and the semi-transparent mirror anterior to the light inlet and thereby be displaced vertically together with this light inlet and the semi-transparent mirror, for example, perhaps in order to adjust the position of the light inlet to the body size of a user.

Here, "coupling" means any type of reciprocal automatic influence that ensures that upon the displacement of the second mirror configuration, the first mirror configuration is also correspondingly displaced. The coupling can be purely mechanical or via an electric motor or actuators that cause the displacement of the first mirror configuration with the help of additional sources of energy. Hereby, software, firmware or a hardware module of the terminal can also control the displacement.

According to embodiments, the first mirror configuration and the second mirror configuration have a first coupling. The first coupling automatically displaces—upon the displacement of the second mirror configuration—the first mirror configuration in such a way that the optical distance between the second mirror configuration and the light inlet of the camera system remains constant. This can be advantageous because it is made possible hereby, for example, to vertically displace the light inlet and the transparent mirror that can be coupled to the second mirror configuration and thus adjust the position of the light inlet to the body size of the person, whereby during the adjustment, the optical distance between the light inlet and the camera system remains constant. The constancy can have the effect that due to the displacement, the size of the face does not change so that the user does not have to slide forward or backward in order to compensate the change in picture size caused by the displacement of the optics.

According to embodiments, at a constant position of the second mirror configuration, the first mirror configuration can be automatically displaced in such a way that the optical distance between the face of the user and the light inlet of the camera system corresponds to a specified value. Additionally or alternatively—at constant position of the second mirror configuration—the first mirror configuration can be automatically displaced in such a way that the size of the facial image captured by the camera system and/or the iris image of the user corresponds to a specified value for capturing the biometric data. For example, the specified value can be specified by the terminal and include, for example, how many pixels a face [should have] that was recorded by means of an image analysis in a first "test picture", how wide and/or how high it should be. By means of an automatic displacement of the first mirror configuration until the measured image sizes and thus face sizes or iris sizes correspond to the desired reference value, images having sufficient size and quality can be recorded in fully automated manner or with only minor assistance by the user.

According to embodiments, the mobile terminal further includes an illumination mechanism for illuminating the user, e.g. white light and/or NIR LEDs. The illumination mechanism and the first mirror configuration have a second coupling. Upon the displacement of the first mirror configuration, the second coupling automatically controls the lighting behavior of the illumination mechanism. This can be advantageous as in a displacement of the first mirror configuration, perhaps for the purpose of adjusting the height of the camera, the illumination is automatically also moved so that the user does not have to also adjust the illumination. A particularly user-friendly and intuitive use of the terminal that is also suitable for untrained users could thereby be provided.

According to embodiments, the mobile terminal further includes an additional camera system, in particular, a wide angle camera system for automatic positioning of the camera and if necessary, also for automatic positioning of the first and second mirror configuration. This additional camera system could, for example, first prepare a wide angle image in order to therein identify the approximate position of a user or his/her face or his/her iris spatially by means of image analysis. With the help of this approximate position, the camera system that is actually designated to record the image of the biometric data can be moved vertically up and down in the opened cover part, and if necessary, its zoom can be changed so that the face or the iris of the user can be recorded at the correct height and size.

According to embodiments, the camera system and the illumination mechanism are components of the cover part.

According to embodiments, the mobile terminal includes a sensor for measuring the ambient brightness and a calibration unit. The calibration unit automatically adjusts the illumination of the illumination mechanism and/or automatically adjusts the light sensitivity of the camera system depending on the measured ambient brightness. This can be advantageous as it further simplifies the use of the mobile terminal as "home enrollment" system, because the calibration unit can ensure that biometric image data is captured in a reliable way, even under various brightness conditions.

According to embodiments, the mobile terminal includes a battery and/or a mains adapter, whereby the battery and/or the mains adapter and the data storage unit are preferably attached to the bottom part. This can be advantageous, as the weight of a battery and/or a mains adapter can stabilize the suitcase in open condition. Thereby it could be brought about, if applicable, that the suitcase stands stable in opened condition without any additional fastening means and does not tip over even the cover part tilts slightly backward by up to 8°.

According to embodiments, the mobile terminal includes an interface for receiving authentication data from an additional security document that is attributed to the user. For example, the name and the address of a user and/or previously captured biometric data of the user can be read out from a personal identification card or passport that is still valid but perhaps expires shortly. Even the MRZ (machine readable zone) and/or a code printed onto a security document, e.g. a card ID or user ID can be captured and received by the mobile terminal automatically. For example, this data can be compared by the mobile terminal relative with the name, address, ID or other data that has been stored in the data storage unit of the mobile terminal over the course of the preparation of the terminal for shipment to this specific user as reference data. The transmission of the authentication data from the security document to the mobile terminal can be accomplished contactless, e.g. by means of an RFID interface or by contact.

According to embodiments, the cover part is connected rotatable with the bottom part by an axle. The cover part remains in a once occupied rotated position, whereby a rotation toward an orthogonal to the surface of the bottom part beyond an angle of 8° is impossible or mechanically difficult and/or causes the issuance of a warning message to the user. This can be advantageous because due to the rotation within a small angular range the sensor, the camera system, for example, can be adapted easily to the body size of the user in such a way that the face is captured by the camera. An even greater rotation, however, could reduce the quality of the biometric image data too much. However, this can be made clear to the user by a corresponding warning message or an increased mechanical resistance upon a rotation beyond 8° (respectively in the direction of the user or counter to the direction of the user), or, as the case may be, even prevented completely.

According to embodiments, the mobile terminal includes a localization unit that captures an actual position of the mobile terminal during the capture of the biometric data. The data storage unit contains information about the geographic region, e.g. an area defined by GPS coordinates of a building or a township. The storage of the captured biometric data in the mobile terminal occurs only then, when the actual position captured during the capture of the biometric data is within the geographic region specified. This can be advantageous because the capture of biometric data can thereby be made even more secure. When a government agency prepares the mobile terminal for shipment upon a request from the user, the address to which the terminal is to be shipped is known. Thereby, that the approximate GPS coordinates of this address are programmed into the terminal, for example, so that it captures and stores biometric data only then, when it is within a maximum distance of this address, for example, within a radius of 50 m around the specified address, additional protection can be provided against an interception of the terminal on its postal route by third parties that send it back with falsified biometric data. This is already made impossible thereby, that these third parties are not located within the predefined geographic region.

According to embodiments, the mobile terminal includes a clock that captures the actual time during the capturing of the biometric data. The data storage unit contains information about the admissible time interval, e.g. a few days or weeks after the terminal has been shipped to the user. The storage of the captured biometric data in the mobile terminals takes place only when the actual time captured during the capture of the biometric data is within the admissible time interval. Analogous to the aforementioned spatial limitation of the functionality of the mobile terminal, an alternative or additional chronological limitation of the potentiality for capturing the biometric data can increase the level of security of the "home enrollment" process.

According to some embodiments, analogous to the local and chronological limitations for capturing the biometric data as described here, a spatial and/or chronological limitation of access by the operator for reading out the biometric data in the terminal is also implemented in the mobile terminal. Thus, the mobile terminal could, for example, have stored the GPS coordinates of that/those government agency office(s) that are authorized to read out the biometric data captured and/or have stored a predefined period of time within which the data stored in the mobile terminal can be read out. The authentication of the operator with respect to the mobile terminal could also include a test as to whether the mobile terminal is located within the predefined maximum distance to the stored GPS coordinates (or another indicator that can capture the spatial position of the terminal) of the specified government agency or the card issuer, and make authentication possible only then, when this is the case. An authentication could also be rejected by the authentication unit upon the elapse of a predefined maximum interval of validity that can start, for example, at the time of shipment of the mobile terminal to the user, which provides a higher level of security of the biometric data captured relative to being read out by unauthorized third parties.

A further aspect related to the disclosure is a method for inserting the biometric data of a user into a security document. The method includes authenticating the user with respect to the server with the first set of authentication data; after successful authentication with respect to the server, use of the first set of authentication data by the server for generating or identifying a credential specifically attributed to the user, whereby the credential identifies its owner as authorized to capture and store the biometric data of the user. Thus, the credential does not enable the terminal to capture and store the biometric data of another person. The credential can thus effect a personalization of the mobile terminal specifically for the user that authenticated itself to the server. Storing the credential in a mobile terminal whereby the mobile terminal includes at least one sensor; thereupon, the mobile terminal can be sent to the user by postal service or courier service, for example; authentication of the user with respect to the mobile terminal by means of the first set of authentication data or by means of a second set of authentication data of the user; authentication of a mobile terminal with respect to the user by means of the stored credential; only in the case of reciprocal successful authentication: automatic or semi-automatic capture of the user's biometric data by the sensor of the mobile terminal; automatic testing of the authenticity of the biometric data captured by the mobile terminal; only in the event the authenticity of the captured biometric data has been determined, storing of the biometric data in the mobile terminal in protected form; then, the mobile terminal can, for example, be sent to the operator of the server and/or the issuer of the security document by the user, for example, by mail; authentication of an operator with respect to the mobile terminal by means of a third set of authentication data that is attributed to the operator; only in the case of a successful authentication of the operator—enabling of a readout of the biometric data stored in the mobile terminal for transmission of the biometric data read out to the security document; and insertion of the transmitted biometric data into the security document.

This method can be advantageous because it can make a secure capturing of biometric data of a user possible for the issuance of a personal security document in the absence of the document issuer having to maintain an elaborate and expensive technical infrastructure.

According to additional embodiments, the method further includes an automatic quality test of the biometric data captured by the mobile terminal, whereby the storage of the biometric data captured in the mobile terminal takes place only when the captured biometric data also meets predefined minimum quality requirements.

For example, the authentication of the user with respect to the server can be accomplished via a network, e.g. the Internet. Preferably, the server is owned by an organization, for example, a government agency or a company that issues the security document for which the biometric data is being captured.

According to embodiments, in addition to the credential, a geographic region is specified and/or an admissible period of time is stored in the mobile terminal. Thereby, the geographic information and/or the admissible period of time are newly determined during each preparation process of the mobile terminal for the user.

According to embodiments, the authentication of the user with respect to the server with the first set of authentication data includes: inserting an additional security document that is attributed to the user into a reading device of the user's computer, whereby the additional security document has stored the first set of authentication data in a protected way; the additional security document, for example, can be a still valid but shortly expiring electronic personal identification card or a passport; sending a request for a mobile terminal via a network from the user's computer to the server, whereby the request contains an identifier of the user; sending an authentication request containing the identifier from the server to an eID server; establishing a secure data transmission channel between the eID server and the additional security document; testing the authenticity and integrity of the additional security document by the eID server; sending a confirmation of the authenticity and integrity by the eID server to the user's computer system; reading out the first set of authentication data by the eID server; the readout of the first set of authentication data can, for example, take place according to a previous submission of an authorization certificate by a service that is provided on the server for a user's computer system. The user's computer system can, for example, have a browser by means of which the user has opened an order form in the Internet for ordering the mobile terminal. In order to authenticate himself/herself to the server, the user can, for example, give the server permission to read out personal data from a currently valid security document by entering a PIN of a currently valid security document, and use these as the first set of authentication data; and transmitting the first set of authentication data read out by the eID server to the server for authenticating the user to the server, whereby the mobile terminal is provided to the user only upon the user's successful authentication by the server.

According to embodiments, in addition to the credential, a reference value is also stored in the mobile terminal. The reference value is specific to the additional security document. The authentication of the user with respect to the mobile terminal with the second set of authentication data includes: inserting an additional security document attributed to the user and that has stored a security document identifier in a reading interface of the mobile terminal; authentication of the user with respect to an additional security document by entering a PIN via a data input interface of the mobile terminal. After successful authentication of the additional security document, transmission of the security document identifier to the mobile terminal whereby the security document identifier functions as the second set of authentication data; for example, the security document identifier can consist of an MRZ of the additional security document; and a comparison of the transmitted security document identifier with the stored reference value by the mobile terminal to authenticate the user to the mobile terminal.

According to embodiments, the authentication of the user with respect to the mobile terminal includes the execution of a BAC protocol and/or an EAC protocol and/or a PACE protocol and/or an SAC protocol between the mobile terminal and the additional security document. This can further increase the security of the method. Additionally or alternatively, the authentication of the user with respect to the terminal can be accomplished thereby, that the mobile terminal receives a data value entered into the mobile terminal by the user and/or the mobile terminal reads out the data value from an additional security document (114) of the user. Thereupon, the mobile terminal compares the data value received or read out with a reference value stored in the mobile terminal. The reference value can, for example, be saved in the data storage unit of the terminal by an employee or representative of the document issuer described here as 'operator' over the course of the personalization of the terminal.

According to embodiments, the credential includes credential, an authorization certificate. The authentication of the mobile terminal with respect to the user includes: transmission of the authorization certificate by the mobile terminal to the additional security document; and testing of the authorization certificate by a processor of the additional security document.

According to embodiments, the additional security document contains saved biometric reference data of the user. The automatic test of authenticity of the biometric data captured by the mobile terminal includes a reading out of the biometric reference data from the additional security document by the mobile terminal and a comparison of the biometric reference data read out with the biometric data of the user that was captured. If the biometric data captured deviates by more than a predefined maximum value from the biometric reference data, a feedback message indicates that the biometric data detected is not authentic. Thereby, the amount of the deviation can be determined by methods that differ by the type of the biometric data compared, because determining the similarity of faces can be implemented in a different way than determining the similarity of fingerprint data. The method further includes an authentication of the user with respect to the additional security document by entering a PIN via a data input interface of the mobile terminal. After successful authentication with respect to the additional security document, a transmission of the security document identifier to the mobile terminal takes place, whereby the security document identifier functions as the second set of authentication data or as a component of such. The mobile terminal also compares the transmitted security document identifier with the stored reference value to authenticate the user to the mobile terminal. The use of the biometric data of the old document for the authenticity test can be advantageous as it can ensure an additional level of security that the user's biometric data captured is actually attributive to that person to whom the terminal was sent (and which would also have to correspond to the data of the old security document).

According to embodiments, the second set of authentication data is transmitted to the mobile terminal together with the user's metadata by the additional security document. The mobile terminal displays the transmitted metadata via a display device of the mobile terminal. The mobile terminal receives input data from the user via an input interface of the mobile terminal and modifies the displayed metadata by the data received via input. The storage of the biometric data captured includes storing the modified metadata. The biometric data stored in the mobile terminal is read out together with the modified metadata, e.g. by means of a specific reading device that is available to the operator of the server or the personnel of the document issuer, and transmitted to the security document. For example, the metadata can be descriptive data of the user, e.g. its address, birthdate, birth place, gender, name additions or similar. The readout of "old" descriptive data from still valid security documents and the storage of the read out and, if applicable, modified descriptive data in the new security document can be advantageous, because it can reduce the manual labor of typing the user's descriptive data such as address data, etc.

The elements of the following embodiments that correspond to each other are identified by the same reference numbers.

FIG. 1 shows a block diagram of the process of "home enrollment" according to one embodiment. A user 112, e.g. a citizen of a country has a security document 114, e.g. an electronic personal identification card, on which personal descriptive data ("metadata") and biometric data is stored and which will expire shortly.

In order to obtain a new security document with current biometric data, the user can, for example, be in his/her residence 118, and does not need to go to the offices 102 of a government agency that has the corresponding infrastructure for forgery-proof capturing of biometric data. Instead, it is sufficient for the user to open an application form, for example, by using a browser installed on its computer 110. The application form can be provided, for example, as an HTML form in the Internet 112 by a server 108 of the government agency that issues the security document. The user 112 can now specify his/her personal data, in particular, his/her name, address and the type of security document that is to be issued. However, so that the server processes the application, it is required that the user authenticates itself to the server by means of a first set of authentication data AD1. This can be accomplished by using a password, for example, or with the help of a still valid security document 114.

For example, the authentication by means of a still valid security document 114 can be accomplished as follows: retrieving the application form has the effect of making an application on the server 108 that is described here as ordering service. The ordering service requires an online authentication from the user. For this, the user places the security document 114 into a reading device that is connected to the user's computer 110. The ordering service sends an authentication request to an eID server (not shown here). Between the eID server and a client software installed on the user's computer 110 (e.g. an identityApp [AusweisApp]), the reading device and a chip of the security document 114, a secure channel is established and the authenticity of the operator of the ordering service, as well as the authenticity and integrity (forgery protection) of the document 114 is tested. The client software displays an authorization certificate of the operator of the ordering service and the requested identification data or data categories to the user 112 via a secure data transmission channel. The user decides which identification data he/she wants to transmit. By inputting the PIN, the user confirms the readout and the transmission of data AD1, which is described here as "first set of authentication data", from document 114 to the eID server. The eID server sends an authentication response and the identification data to the ordering service. The authentication response and the identification data are read out. The service tests the authentication results and decides whether the authentication has been successful. In conclusion, the user receives a message indicating the result.

If the user 112 has successfully identified himself/herself to the ordering service by means of the first set of authentication data AD1 and thus also with respect to server 108, a credential C is initiated specifically for the user 112. The credential C can, for example, be generated automatically by server 108, or on a different computer that is operated by the issuer of the newly requested security document. The credential can be generated fully automatically or semi-automatically with the help and control of an operator 106 who is working for the issuer of the new document. The credential can be issued, for example, in the form of an authorization certificate or contain such. The credential is stored in a data storage unit of the mobile terminal 104. Moreover, one or more reference values that are specific to the user, e.g. its name and address or secret code that is sent to the user in a secure way can be stored in the mobile terminal. Thereby, the terminal is personalized for the applicant 112. If applicable, even additional authorization certificates and reference values can be stored, e.g. family members that are registered under the same address.

The personalized mobile terminal can now be sent to the address noted in the ordering form and/or in the identification card 114 in a cost-effective way, for example, by mail.

After receiving the mobile terminal, the user 112 can start it, e.g. thereby, that the user places the suitcase-like terminal on the table, opens the cover and actuates the start button. Given that the user will be handling the mobile terminal, it is configured in such a way that even a non-technical lay person receives clear instructions at all times as to which step is to be performed next in order to capture biometric data of sufficient quality.

First, however, it is required that the user authenticates himself/herself to the mobile terminal. This can be accomplished thereby, for example, that the user inputs a secret code that he/she received from the document-issuing office into the terminal, or personal data from a still valid security document are read out by the terminal and the data that was input or read out is compared with the reference values. Moreover, the terminal must authenticate itself to the user 112 by means of the credential C in order to prove that the terminal has the right to capture biometric data from the user.

After successful reciprocal authentication of user 112 and terminal 104, the terminal captures the user's biometric data BD and stores such in an internal data storage unit.

The biometric data can be stored in such a way, for example, that a public key 312 that is stored in the mobile terminal encrypts the biometric data BD and a private signature key 314, likewise stored in the terminal, signs the data. Thereby, the private signature key 314, together with the public signature test key 126 of the document issuer forms an asymmetric cryptographic key pair. Thereby, the public encryption key 312, together with a private decryption key 124 of the document issuer forms an asymmetric cryptographic key pair. In this way, the public signature test key 126 and the private decryption key 124 are administered by the issuer of the security document 116, e.g. a government agency.

After successfully capturing the biometric data, the suitcase-like terminal 104 can once again be closed and sent back to the authority that is issuing the new identification card. Upon arrival there, an operator 106, for example, an employee of the agency authenticates himself/herself by means of a third set of authentication data, e.g. by a password, by using specific software-based or hardware-based security tokens or the like with respect to the terminal. The operator can access the data stored in the terminal only upon successful authentication that can also include, for example, a decryption step of the biometric data of the user by means of the private decryption key 124. In addition to the decryption, a signature test of the signed biometric data BD can be performed by means of the public signature test key 126 in order to ensure that the biometric data captured were not manipulated by third parties.

According to embodiments, the terminal does not have any data exchange interfaces requiring contact, i.e. no USB interface or CD drive in addition to the sensors for the biometric data and the already cited user interfaces such as keyboard, signature pad, NFC interface, etc. The terminal only has a contact-less data exchange interface, e.g. a WLAN adapter for inserting the credential and the reference values and for reading out the biometric data captured by the operator. This contact-less interface can only be activated thereby, that the operator connects a hardware token to the terminal which securely authenticates the operator to the terminal. It is also possible that the WLAN adapter is preconfigured for the access data of the WLAN network of the issuing authority and can exchange data selectively only with this WLAN after the operator has been authenticated. This increases the protection of the biometric data from being read out by unauthorized third parties.

The decrypted and signature-tested biometric data BD of the terminal can then be transmitted automatically or manually to a new security document 116 that is to be issued for the user 112 upon his/her request. The completed document can now be sent to the user 112, e.g. via the postal service. The security document specifically issued for the user 112 thus contains trustworthy, high-quality biometric data (facial image, iris image, fingerprint data, etc.) while the user did not have to go to the offices 102 of the government agency.

Figure 2:
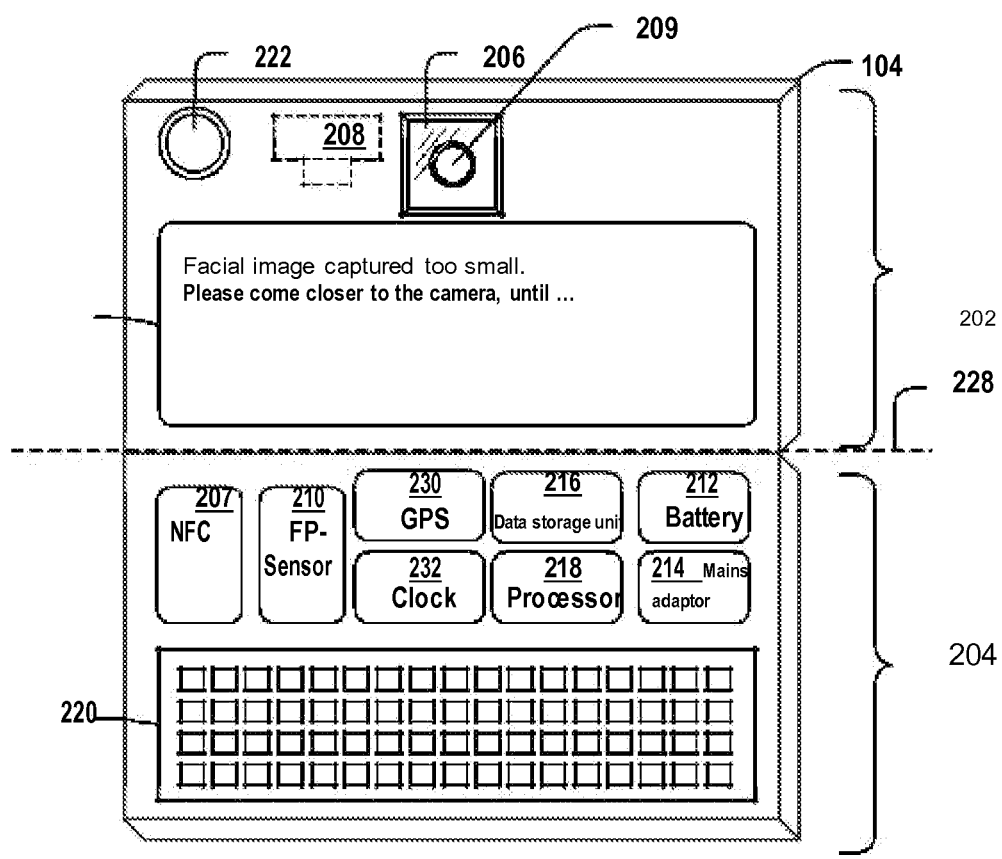
FIG. 2 shows an open, suitcase-like mobile terminal from the front.

FIG. 2 shows an open suitcase-like mobile terminal 104 from the front. The mobile terminal consists of a cover part 202 and a bottom part 204. The cover part and the bottom part can be rotated against each other by an axle 228. The cover part contains a camera system 208 and a light inlet 209, which is covered by a semi-transparent mirror 206. Moreover, the cover part contains the display that guides the user 112 through the entire process of data capture, feedback about correct and/or incorrect operation and/or the quality of the biometric data captured and shows the user how he or she must operate the device in the next step. In addition to display 226, further elements can be attached to the cover part or the bottom part that are in a position to signal to the user, visually or acoustically, what is to be done or to which result the user's last action has led. This can include LED elements, speakers or the like, for example.

Preferably, heavy components such as, for example, a battery 212 and/or a mains adapter 214 for connecting the terminal to an external power supply are located in the bottom part. Moreover, the terminal can contain a data storage unit 216 for storing the credential and the biometric data of the user, an interface 207 for receiving authentication data from a security document 114 of the user, a sensor 210 for capturing fingerprint data as the biometric data and one or more processors 218 that control the interplay of the elements cited. The fingerprint sensor can, for example, be designed as "one finger scanner" as "two finger scanner" or as "four finger scanner". The use of two or more finger scanners can be advantageous as it is thereby ensured that left fingers are captured as left fingers and right fingers as right fingers. The use of four-finger scanners could be advantageous as these make it possible to easily distinguish between left/right and moreover, even in the case of insufficient quality of the prints of the index finger, it is possible to capture the additional fingers according to ICAO specifications without any complicated user guidance.

It is also possible that an iris camera with its own light inlet is located in the cover part. Even this light inlet can be covered by a semi-transparent mirror whose reflected light components provide feedback information relative to the proper positioning of the iris.

Additionally, the terminal can contain a GPS sensor 230 for capturing the actual position of the terminal and/or a clock 232 for capturing the actual time.

Moreover, the mobile terminal 104 can contain a user interface, for example, a keyboard 220, which makes it possible for the user to enter, for example, his/her descriptive data (name, address, etc.) and/or a PIN manually for authentication with respect to his/her currently still valid security document 114. The keyboard can also be a touch-screen and thus a part of the display 226. Additionally, the terminal can have a signature pad which can capture the signature of the user as the user's biometric data.

An illumination mechanism 222 can likewise be integrated into the cover part in some embodiments. Preferably, the illumination mechanism is so strong that it provides sufficient brightness for qualitatively sufficiently, high-quality pictures, even then, when it is the only source of light in the room. This can be advantageous as the user can switch off other interfering light sources that lead to undesired reflections, for example.

Figure 3:
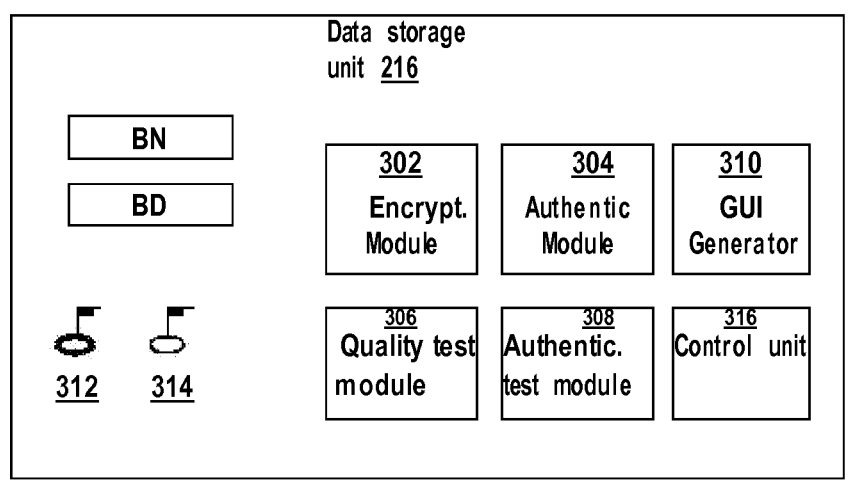
FIG. 3 shows a block diagram of the data storage unit of the terminal.

FIG. 3 shows a block diagram that illustrates the contents of the data storage unit 216 of the terminal in one embodiment in detail. The storage unit can contain various modules 302 through 310, 316, that can represent parts of a software program or self-contained software programs respectively, or can also be implemented as hardware functionality.

A cryptographic module 302 serves to encrypt the biometric data BD received in order to store this data in encrypted and thus protected form in data storage unit 216. The authentication module 304 performs those steps that are required so that the mobile terminal 104 can authenticate itself to the user 112 and/or to the user's still valid document 114. Moreover, it tests the second set of authentication data AD2 that is received by the terminal during the course of an authentication attempt by the user 112. Thereby, this can be the same data AD1, AD2 that was used by the user for authentication with respect to server 108 already.

The quality testing module 306 controls the quality of the biometric data captured. If the test shows that the biometric data does not correspond to a minimum level of quality, the module 306 triggers a corresponding warning message in collaboration with the GUI generator module 310 on display device 226. The warning message can contain information concerning the circumstance that has most likely led to the bad quality of the biometric data and which steps the user must take in order to increase its quality when capturing his/her biometric data again.

The authenticity test module 308 tests whether the user's biometric data BD that was captured is authentic. Thereby, the test methods used are adapted to the type of sensors 208, 210 used. Thus, the authenticity test module is intended to identify and ward off any possible attacks with artificial or falsified biometric features. The technical methods for this differ depending on the biometry. Preferably, the authenticity test module can implement one or more methods for live recognition, i.e. the module tests whether the biometric feature offered is that of a living person. The methods implemented in the authenticity test module can include, for example, the following test methods, cited here only by way of example: method for 3D facial recognition in order to ward off fraudulent attempts with a photograph; method for 2D facial recognition that is based on individual eye movements. The person to be identified is asked via the display device 226 to follow a point on the display 226. With the camera and corresponding analysis software, the eye movement is tracked and analyzed. Fraudulent attempts by means of a picture can thus be prevented; analysis of the delineation of illumination points of an iris that are visible in a photograph. This is significantly different on a moist, curved surface of a living eye than on the surface of a 2D photograph; in iris identification (eye signature) a fraudulent attempt can thus be identified with the help of a photograph; for the fingerprint sensor: capturing of additional features such as skin resistance and temperature for live recognition; pulse measurements via infrared sensors or combinations of optical methods that X-ray the finger in the range of visible or infrared light and analyze the reflected or transmitted light.

A control unit 316 coordinates the interplay of the various modules 302 through 308, 310 and the corresponding hardware components 208, 222, 230, 232, 207. The GUI generator module 310 controls the content of the display 226 depending on instructions by the control unit 316. The cryptographic module 302 encrypts the biometric data BD with the public encryption key 312 and signs it with the private signature keys 314 that are stored in data storage unit 216 of the terminal.

Figure 4:
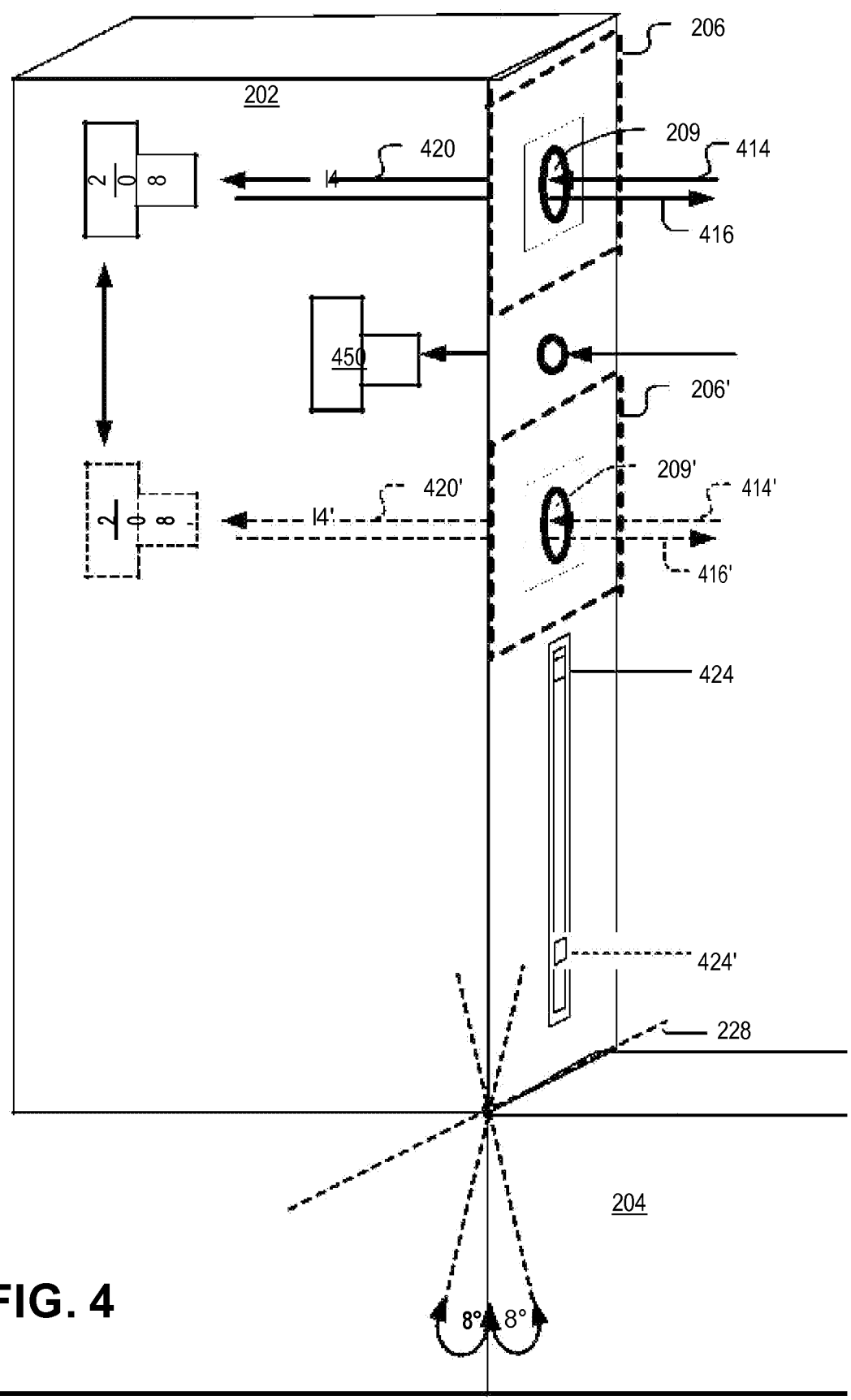
FIG. 4 shows an open mobile terminal from the side.

FIG. 4 shows an open mobile terminal from the side. The cover part 202 is rotatable via an axle 228 by up to 8° toward the perpendicular relative to the surface of the bottom part 204. Preferably, the cover part remains in position once it has been manually adjusted or rotated by the user. For example, this can be prevented thereby that a relative motion of the components that can be rotated against each other—the bottom part and the cover part—is prevented by sufficiently high mechanical friction. Only an additional manually applied force by the user will cause a relative motion of these components. Preferably, a rotation beyond the 8° shown in FIG. 4 is impossible or at least mechanically more difficult. Thus, the user would have to exert significantly more force to rotate the cover part by more than 8°. This can prevent that the user prepares facial images that are distorted in perspective with the camera 208 due to too much rotation of the cover part, which, as a rule, do not have the minimum quality that is required for passport pictures.

The terminal can contain mechanical positioning means 424 that are coupled to the camera system 208, the semi-transparent mirror 206 and the light inlet 209 that make it possible for the user to adjust the height of the camera system by displacing the positioning means 424, the corresponding light inlet and the semi-transparent mirror and to adapt such to his/her body size. This is indicated by the dotted copy of the camera system 208' and the light inlet 209'. Although the user 112 is preferably sitting on a chair that is positioned before a tabletop on which the open terminal was placed in turn. Size differences between persons therefore do not weigh as heavily as when taking photographs of standing persons. In spite of that, the mechanical displaceability of the camera system 208 and the corresponding light inlet 209 can help to adjust the position of the camera to different upper body sizes of persons. According to some embodiments, the mobile terminal can also contain a wide angle camera 450. It first takes wide angle pictures that are subjected to an image analysis by the terminal 104 in order to determine the approximate position of the face of the person, for example, by means of facial recognition and a determination of the size of the face within the overall picture of the wide angle images. With the help of the thus determined position of the face, the camera system 208 and the light inlet 209 that is coupled to the camera system can now be vertically displaced automatically in such a way that the light inlet 209 is at the same level as the face of the user to the largest extent possible. Moreover, an optical or mechanical zoom mechanism of the camera system 208 can be activated that has the effect that the face is captured in the required size and resolution.

Figure 5:
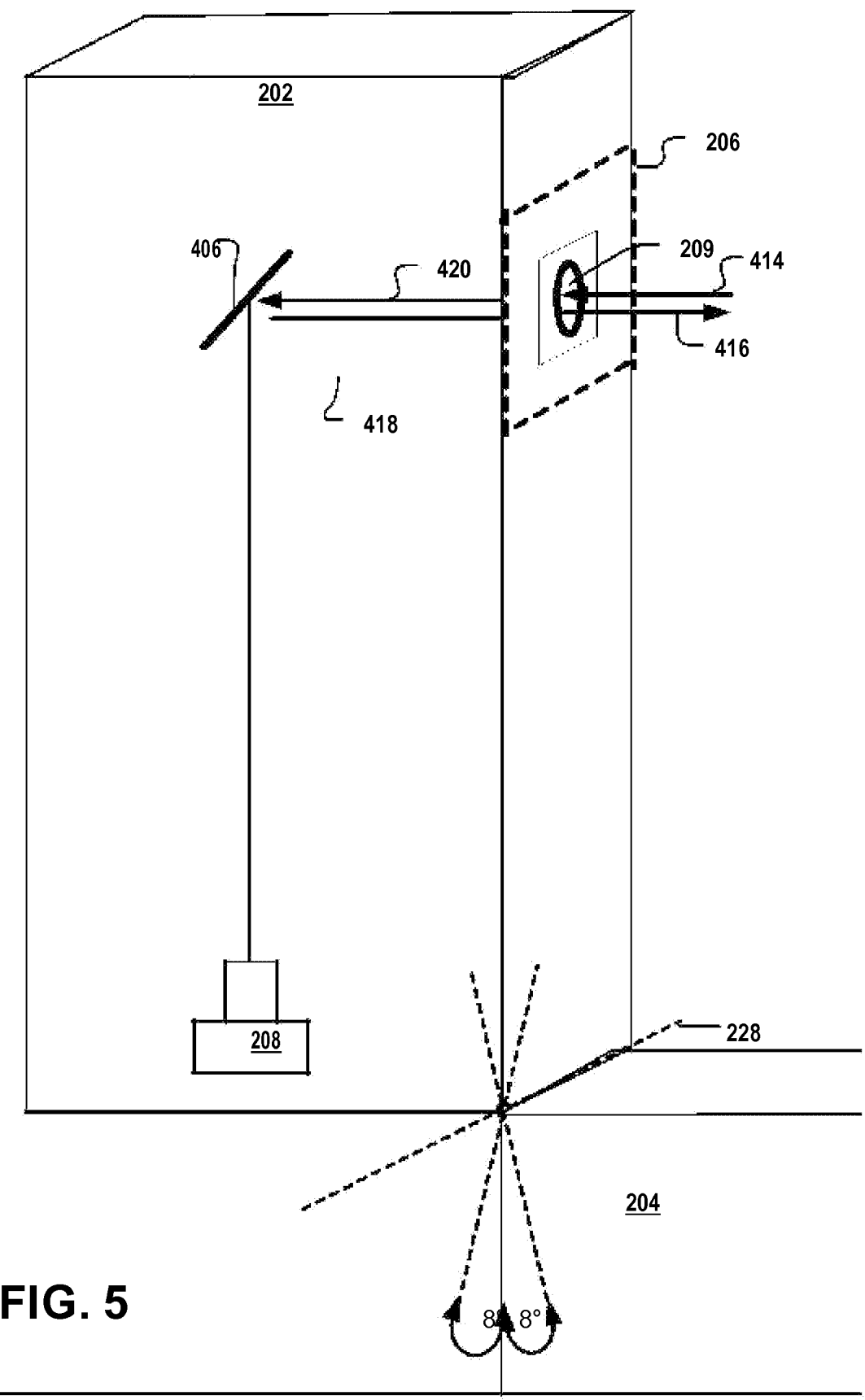
FIG. 5 shows an additional mobile terminal from the side.

FIG. 5 shows a further open terminal from the side. Here, the camera system 208 is attached to the bottom part of the open cover part. The light 420 transmitted through light inlet 209 and the semi-transparent mirror 206, which impinges primarily parallel to the bottom surface of the terminal, is deflected by the mirror configuration 406 in such a way that it is captured by the camera system 208. This arrangement can be advantageous because it permits a flatter construction of the cover part and thus a more compact structure of the mobile terminal 104 overall.

According to some embodiments, the mirror configuration 406, the light inlet 209 and the semi-transparent mirrors are coupled to each other mechanically and are vertically displaceable as a unit and thus adjustable for various (upper body) sizes. A wide angle camera 450 (not shown) can—analogous to the embodiment described n FIG. 4—be used for automatic positioning of the mirror configuration, the light inlet 209 and the semi-transparent mirror.

FIG. 6 shows a cross section of an open mobile terminal in a further embodiment from the side. Even this embodiment can make a flat construction of the cover part possible and thus a compact structure of the terminal.

Figure 6A:
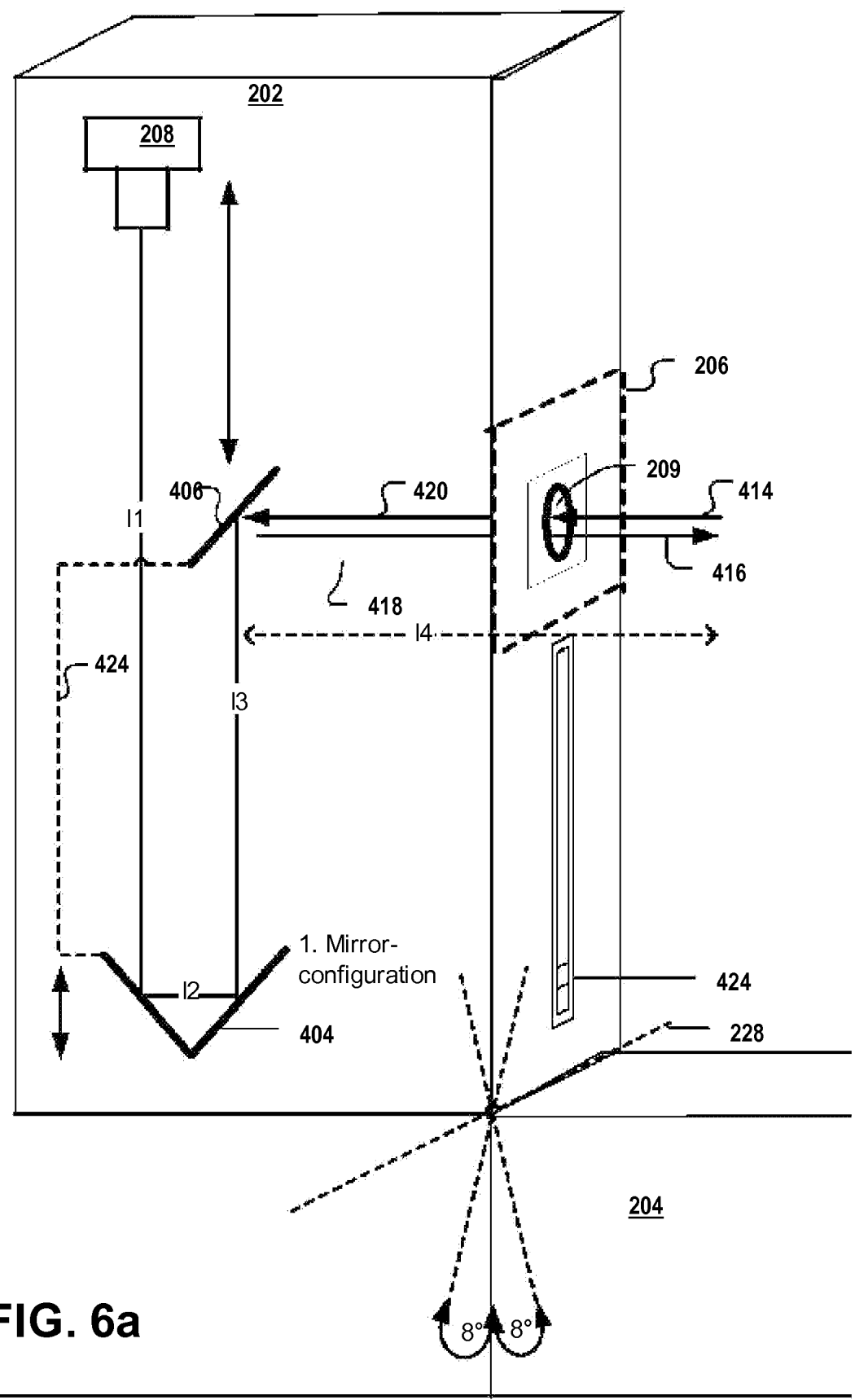
FIG. 6a and FIG. 6 b show an additional mobile terminal from the side.
Figure 6B:
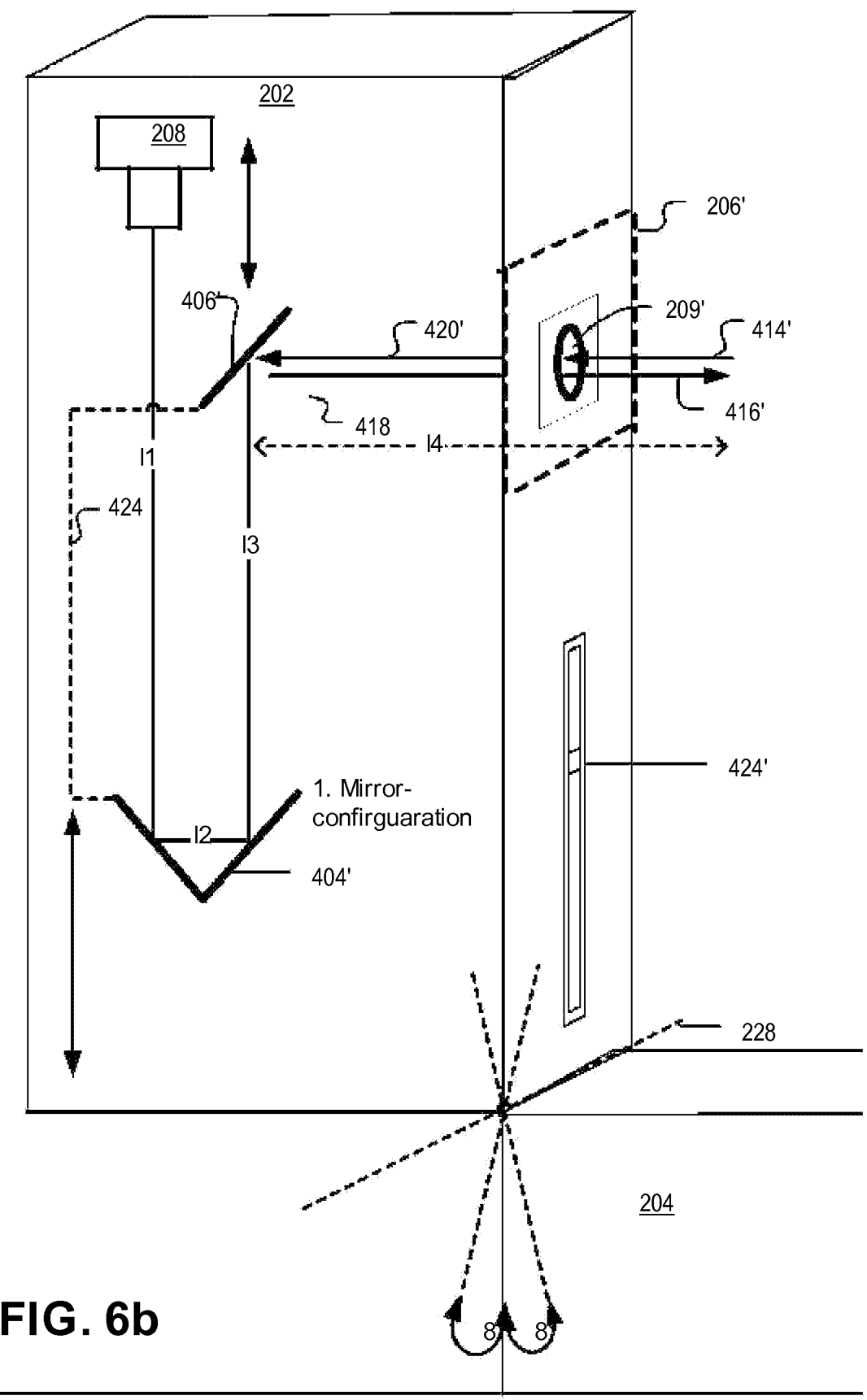

FIG. 6a shows the cover part containing a first mirror configuration 404 and a second mirror configuration 406 prior to a displacement of the first and second mirror configuration. FIG. 6b shows the cited cover part after the displacement.

The situation shown in FIG. 6a could correspond to the initial situation, i.e. the situation when the user opens the terminal and switches it on. In this position of the two mirror configurations 404, 406, the light inlet 209 and the semi-transparent mirror 206, persons whose tip of the nose is approx. 60 cm above the tabletop on which the open terminal has been placed can be photographed in such a way that the light rays absorbed by the face pass the light inlet almost parallel to the tabletop.

For example, the distance of the face of the person from the second mirror configuration 406 can be a constant length of l4. The optical path between the first mirror configuration 404 and the camera system 208 can have a length of l1. The optical path between the two halves of the first mirror configuration is described as l2, the optical path between the first and the second mirror configuration as l3.

The optical path l1+l2+l3+l4 between the camera and the face of the person could, for example, be 70 cm to 250 cm, preferably 100 cm to 120 cm and remain constant when the two mirror configurations displace. The optical path shown in FIG. 6b between the camera and the face of the person would accordingly be 70 cm to 250 cm, preferably 100 cm to 120 cm.

The dimensions shown in FIG. 6a that add, for example, to 120 cm, could be, for example: l1=50 cm; l2=10 cm; l3=20 cm; l4=40 cm. In this configuration, the light inlet 209 and the semi-transparent mirror coupled to the light inlet or the second mirror configuration could be located at a certain height (vertical position) relative to the open cover part. This position could, for example, be too low in order to capture the face of a person properly. By relative displacement of the first and second mirror configuration as well as the light inlet and the semi-transparent mirror, the overall configuration of the light path can look as shown in FIG. 6b. Here, even the face of a large person can now be captured. The vertical displacement can be accomplished by actuating the positioning means 424, for example, a mechanical displacement knob, or automatically.

The dimensions shown in FIG. 6b that likewise add to a total length of the light path of 120 cm can be, for example: l1=40 cm; l2=10 cm; l3=30 cm; l4=40 cm. As the total light paths in FIGS. 6a and 6b are equally long, the face of the user in 6a and 6b is also captured with the same resolution or size.

Figure 7:
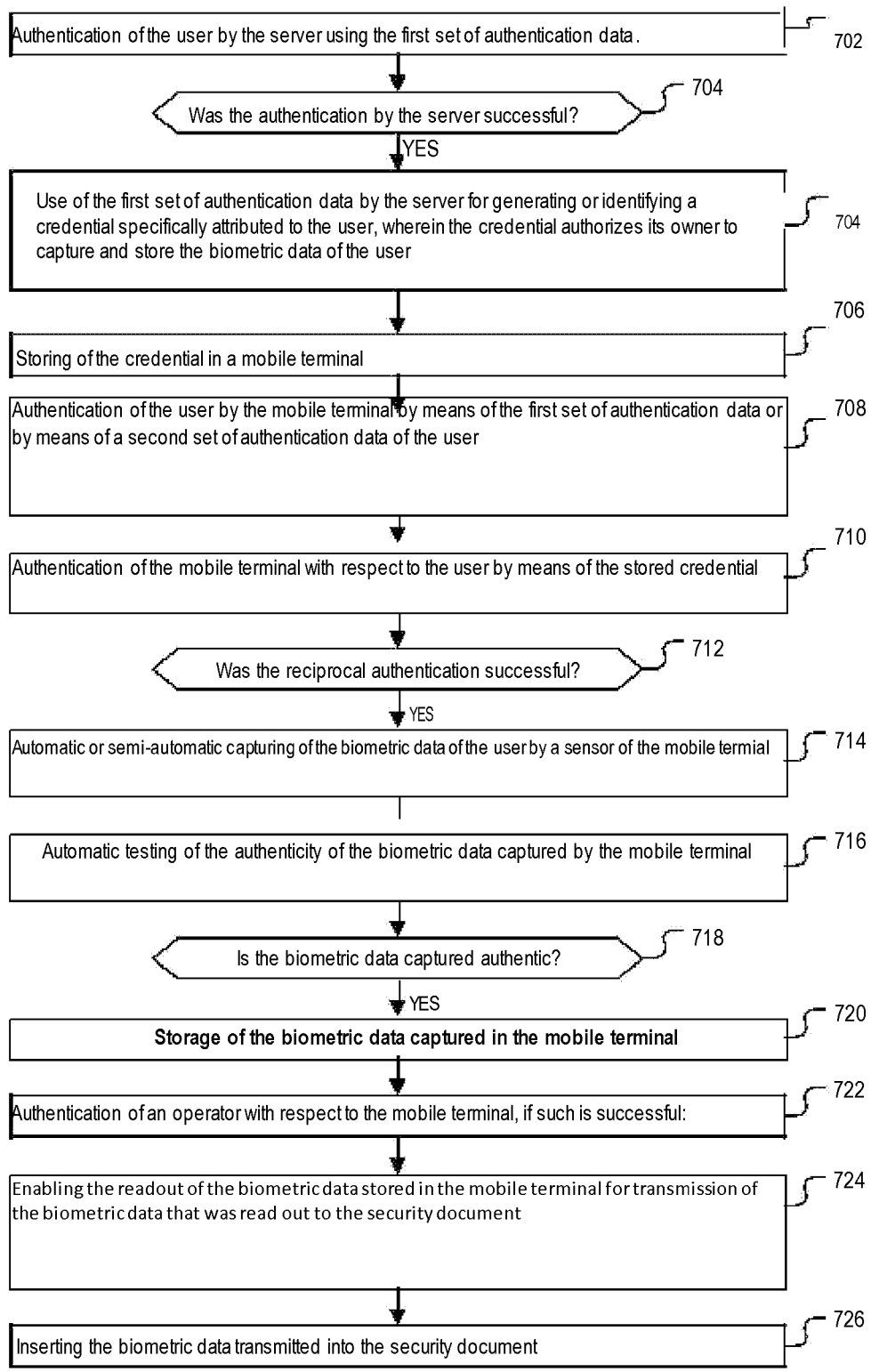
FIG. 7 shows a flow diagram for the method according to an embodiment.

FIG. 7 shows a flow diagram for a method according to an embodiment. In a first step 702 the user 112 authenticates itself to server 109 with a first set of authentication data AD1, for example, in the course of filling out an electronic application form to request that a mobile terminal be sent.

The authentication data can, for example, be read out from a still valid additional identification document 114. After successful authentication with respect to the server, the server uses the first set of authentication data in step 704 to generate or identify a user's specifically attributed credential C. In step 706, the credential is stored in the mobile terminal 104. In step 708, the user authenticates itself to the mobile terminal by means of the first set of authentication data or by means of other ("second") authentication data. In Step 710, the mobile terminal authenticates itself to the user by means of the stored credential and thereby proves that it originated from a trustworthy document issuer and is authorized to capture biometric data.

If the terminal determines in step 712 that the terminal and the user have successfully authenticated reciprocally, the terminal automatically or semi-automatically captures one or several data sets of biometric data BD of the user in step 714. The biometric data can come only from one sensor, e.g. a camera for taking a facial image or from several sensors, e.g. from the camera and a fingerprint sensor. In step 716 the mobile terminal tests if the captured biometric data is authentic. In step 720, the terminal stores the biometric data captured in protected form if the data was determined to be authentic in step 718. In step 720, the biometric data captured is stored in the terminal. After authentication of an operator in step 722 with respect to the terminal, it permits the readout of biometric data BD of the user that is stored in a protected way in step 724, in order to transmit the biometric data read out in step 724 into a new security document and to insert it there. As a result, the new security document can be provided with the user's trustworthy biometric data and thereby personalized.

Some aspects and features of the disclosed embodiments are set out in the following numbered items:

1. A mobile terminal (104) for capturing the biometric data (BD) of a user (112), comprising:
   a data storage unit (216) containing a credential (C) that is specifically attributed to the user, wherein the credential authorizes the mobile terminal to capture and store the biometric data of the user;
   an authentication module (304) for authenticating the user to the mobile terminal by means of authentication data (AD2) attributed to the user and for authenticating the mobile terminal to the user by means of the stored credential (C);
   a sensor (208, 210) for capturing the biometric data of the user;
   a control unit (316), that is configured to capture the biometric data (BD) of the user automatically or semi-automatically by means of the sensor only upon reciprocal successful authentication of the user and the mobile terminal;
   a test unit (308) for automatic testing of the authenticity of the biometric data captured;
   wherein the control unit is configured to store the biometric data captured in the data control unit (216) in protected form only then, when the biometric data captured is authentic according to the test;
   wherein the authentication module (304) is configured to authenticate an operator (106) to the mobile terminal by means of additional authentication data (AD3) attributed to the operator;
   wherein the control unit is configured to authorize a readout of the biometric data that is stored in a protected way only in the case of a successful authentication of the operator in order to transmit the biometric data read out to a security document (116).

2. The mobile terminal (104) according to Claim 1, wherein the sensor (208, 210) consists of:
   a camera system for capturing image data of a face and/or an iris of the user (112) as the biometric data; or
   a fingerprint sensor for capturing fingerprint data of the user as the biometric data; or
   a sensor for vein patterns in the hand; or
   a sensor for retina patterns; or
   a sensor for nailbed patterns; or a signature pad; or a microphone for capturing a voice profile; or a combination consisting of two or more of the cited sensors.

3. The mobile terminal (104) according to one of the preceding Claims, having:

a quality test module (306) for automatic testing of the quality of the biometric data captured, wherein the storage of the biometric data captured in the mobile terminal takes place only when the biometric data captured also meets predefined, minimum quality requirements.

4. The mobile terminal (104) according to one of the preceding Claims, wherein das mobile terminal has the shape of a suitcase having at least one carrying handle, a bottom part (204) and a cover part (202), wherein the sensor comprises a camera system (208) that is attached on the inner side of the cover part; and/or wherein the sensor comprises a fingerprint sensor (210) that is attached to the inside of the bottom part; and/or wherein the cover part has a display device (226) on its inside for displaying operating instructions to the user while the biometric data is being captured.

5. The mobile terminal (104) according to Claim 4, wherein the cover part comprises a semi-transparent mirror (206) in addition to the camera system (208), wherein the semi-transparent mirror can be aligned automatically and/or manually in such a way that the semi-transparent mirror is positioned between the user and the camera system, wherein the semi-transparent mirror is aligned in such a way that on the side of the semi-transparent mirror facing the user, the light path (414) of the light impinging on the semi-transparent mirror is parallel to the light path (416) of the part of this light that is reflected back by the semi-transparent mirror.

6. The mobile terminal (104) according to Claim 5, further having a first (404) and a second (406) mirror configuration that are mounted on the side (418) of the semi-transparent mirror (206) facing away from the person in such a way that the part (420) of the light impinging on the second mirror configuration (406) transmitted by the semi-transparent mirror (206) is directed onto the first mirror configuration (404) by the second mirror configuration, wherein the first mirror configuration (404) is mounted in such a way that this part of the transmitted light is reflected onto the camera system (208), wherein the position of a light inlet (209) for the camera system (208) is coupled to the position of the semi-transparent mirror.

7. The mobile terminal (104) according to Claim 6, wherein the first mirror configuration (404) and/or the second mirror configuration (406) can be displaced parallel to the light path (13) of that part of the light that is transmitted by the semi-transparent mirror (206) between the first mirror configuration and the second mirror configuration.

8. The mobile terminal (104) according to Claim 6 or 7, wherein the first mirror configuration (404) and the second mirror configuration (406) have a first coupling, wherein the first coupling is constituted in such a way that upon the displacement of the second mirror configuration (406), it automatically displaces the first mirror configuration (404) in such a way that the optic distance between the second mirror configuration (406) and a light inlet (209) of the camera system (208) remains constant.

9. The mobile terminal (104) according to one of Claims 6 through 8, wherein die first mirror configuration (404) at a constant position of the second mirror configuration (406) is automatically displaceable in such a way that the optical distance between the face of the user (112) and the light inlet (209) of the camera system (208) corresponds to a specified value and/or the size of the facial image captured by the camera system (208) and/or the iris image of the user corresponds to a predefined value for capturing the biometric data (BD).

10. The mobile terminal (104) according to one of Claims 6 through 9, further having an illumination mechanism (222) to illuminate the user (112), wherein the illumination mechanism (222) and the first mirror configuration (404) have a second coupling, wherein the second coupling is provided in such a way that it automatically controls the illumination behavior of the illumination mechanism (222) upon the displacement of the first mirror configuration (404).

11. The mobile terminal (104) according to one of Claims 3 through 10, wherein the camera system and the illumination unit (222) are a component of the cover part (202).

12. The mobile terminal (104) according to one of the preceding Claims 2 through 11, further having:

a sensor for measuring the ambient brightness; and a calibration unit to automatically adjustment the light intensity of the illumination mechanism and/or to automatically adjustment the light sensitivity of the camera system depending on the ambient brightness measured.

13. The mobile terminal (104) according to one of the preceding Claims, further having:

a battery and/or a mains adapter wherein the battery and/or the mains adapter and the data storage unit (216) are preferably attached to the bottom part (204).

14. The mobile terminal (104) according to one of the preceding Claims, further having:

an interface (207) for receiving authentication data (AD1, AD2) from an additional security document (114) attributed to the user.

15. The mobile terminal (104) according to one of the preceding Claims 4 through 14, wherein the cover part (202) is connected rotatable with the bottom part (204) by an axle (228), wherein the cover part stays in a rotated position once it has assumed such, wherein the rotatable connection is designed in such a way that the entire rotation toward an orthogonal to the bottom part is impossible beyond an angle of 8°, or is more difficult mechanically and/or triggers the out-put of a warning message.

16. The mobile terminal (104) according to one of the preceding Claims, further having:

a localization unit (230) that is configured to capture the current position of the mobile terminal while the biometric data is being captured;

wherein the data storage unit contains geographic region specifications;

wherein the storing of the biometric data captured in the mobile terminal takes place only when the current position is found to be within the geographic region specified when the biometric data is being captured.

17. The mobile terminal (104) according to one of the preceding Claims, further having:

a clock (232) that captures the current time while the biometric data is being captured;

wherein the data storage unit contains a specification of an admissible period of time;

wherein the storage of the biometric data in the mobile terminal takes place only when the actual time during the capture of the biometric data is found to be within the admissible period of time.

18. A method for inserting the biometric data (BD) of a user (112) into a security document (116), comprising:
    authentication (702) of the user to a server (109) with a first set of authentication data (AD1);
    after successful authentication to the server, using the first set of authentication data by the server for generating or identifying credentials (C) specifically attributed to a user, wherein the credential authorizes its owner to capture and store the biometric data of the user;
    storage of the credential in a mobile terminal (104), wherein the mobile terminal comprises at least one sensor (208, 210);
    authentication of the user to the mobile terminal by means of a first set of authentication data or by means of a second set of authentication data (AD2) of the user;
    authentication of the mobile terminal to the user by means of the stored credential;
    only upon successful, reciprocal authentication: automatic or semi-automatic capturing of the biometric data (BD) of the user by means of the sensor of the mobile terminal;
    automatic testing of the authenticity of the biometric data captured by the mobile terminal;
    only in the case the biometric data was found to be authentic, storage of the biometric data captured in the mobile terminal in protected form;
    authentication of an operator (106) by means of a third set of authentication data (AD3), that is attributed to the operator with respect to the mobile terminal;
    only in the case of a successful authentication of the operator, enabling of the readout of the biometric data stored in the mobile terminal for transmission of the biometric data read out to the security document; and
    insertion of the biometric data transmitted into the security document.

19. The method according to Claim 18, further comprising:
    an automatic test of the quality of the biometric data captured by the mobile terminal, wherein the storage of the biometric data captured in the terminal takes place only when the biometric data captured also meets predefined minimum quality requirements.

20. The method according to Claim 18 or 19, wherein in addition to the credential, a geographic region is specified and/or an admissible period of time is stored in the mobile terminal, wherein the specification of the geographic region and/or the admissible timeframe are determined anew each time the mobile terminal is made available to the user (112).

21. The method according to one of the preceding Claims 18 through 20, wherein the authentication of the user to the server (109) with the first set of authentication data (AD1) comprises:
    inserting an additional security document (114) attributed to the user (112) into a reading device of a user computer (110), wherein the additional security document has stored the first set of authentication data (AD1) in a protected way;
    sending a request for making a mobile terminal available by using a network (122) from a user computer to the server (109), wherein the request contains an identifier of the user;
    sending of an authentication request containing the identifier from the server (109) to an eID server;
    establishing a secure data transmission channel between the eID server and the additional security document (114);
    testing the authenticity and integrity of the additional security document by the eID server;
    sending a confirmation of the authenticity and integrity from the eID server to the user's computer system;
    reading out the first set of authentication data by the eID server;
    transmitting the first set of authentication data from the eID server to the server (109) to authenticate the user (112) to the server (109), wherein the mobile terminal is provided to the user (112) only upon successful authentication of the user (112) by the server (109).

22. The method according to one of the preceding Claims 18 through 21, wherein in addition to the credential (C) a reference value is also stored in the mobile terminal that is specific to the additional security document (114), wherein the authentication of the user to the mobile terminal (104) with the second set of authentication data (AD2) comprises:
    inserting an additional security document (114) attributed to the user (112) and that has stored a security document identifier into a read interface (207) of the mobile terminal;
    authenticating a user (112) to the additional security document (104) by means of inputting a PIN into a data input interface (220) of the mobile terminal;
    after successful authentication to the additional security document, transmission of the security document identifier to the mobile terminal, wherein the security document identifier functions as the second set of authentication data;
    comparing the transmitted security document identifier with the stored reference value by the mobile terminal to authenticate the user to the mobile terminal.

23. The method according to one of the preceding Claims 18 through 22, wherein the authentication of the user to the mobile terminal comprises:
    executing a BAC protocol and/or an EAC protocol and/or a PACE-protocol and/or an SAC protocol between he mobile terminal and the additional security document (114) and/or
    comparing a data value entered by the user into the mobile terminal and/or read out by the mobile terminal from an additional security document (114) of the user with a reference value stored in the mobile terminal.

24. The method according to one of Claims 18 through 23, wherein the credential (C) comprises an authorization certificate, wherein the authentication of the mobile terminal with respect to the user (112) comprises:
    transmitting the authorization certificate from the mobile terminal to the additional security document (114), and
    testing the authorization certificate by means of a processor of the additional security document.

25. The method according to one of Claims 18 through 24, wherein the additional security document (114) has stored biometric reference data of the user (112), wherein the automatic test of the authenticity of the biometric data captured by the mobile terminal comprises:
    reading out the biometric reference data from the additional security document by the mobile terminal;
    comparing the biometric data read out with the biometric data of the user (112) that was captured;
    if the biometric data captured deviates from the biometric reference data by more than a predefined maximum value, feedback of a result indicating that the biometric data determined is not authentic.

Authentication of the user (112) with respect to the additional security document (104) by inputting a PIN into data input interface (220) of the mobile terminal;

after successful authentication with respect to the additional security document, transmission of the security document identifier to the mobile terminal, wherein the security document identifier functions as the second set of authentication data;

comparing the transmitted security document identifier with the stored reference value by the mobile terminal to authenticate the user to the mobile terminal.

26. The method according to one of Claims 18 through 25, wherein the second set of authentication data (AD2) together with the metadata of the user (112) are transmitted to the mobile terminal by the additional security document (114);

display of the transmitted metadata by a display device (226) of the mobile terminal;

modification of the metadata displayed by the data input, wherein the input data are received by the mobile terminal from the user via an input interface (220) of the mobile terminal;

wherein the storage of the biometric data captured comprises a storage of the modified metadata;

wherein the biometric data stored in the mobile terminal is read out together with the modified metadata and transmitted to the security document (116).

REFERENCE NUMBERS 102 offices of the document issuer
104 mobile terminal
108 operator
109 server
110 user computer system
112 user
114 additional security document
116 security document to be issued
118 user of residence
122 network
124 private key for decryption
126 public signature test key
C credential
BD biometric data
AD1 first set of authentication data
AD2 second set of authentication data
AD3 third set of authentication data
202 cover part
204 bottom part
206 semi-transparent mirror
207 NFC interface
208 camera system
209 light inlet
210 fingerprint sensor
212 battery
214 mains adapter
216 data storage unit
218 processor
220 keyboard/data input interface
222 illumination mechanism
226 display element
230 GPS module
232 clock
302 cryptographic module
304 authentication unit
306 quality test module
308 authenticity test module
310 GUI generator
312 public encryption key
314 private signature key
316 control unit
404 first mirror configuration
406 second mirror configuration
414 incident light (into light inlet)
416 light path of the light reflected by the semi-transparent mirror
418 sides of mirror facing away from the user
420 light path of the light transmitted by the semi-transparent mirror 209
424 operating element for the vertical displacement of light inlet 209 and camera system 208
450 wide angle camera system
l1-l4 light paths
702-726 steps

What is claimed is:

1. A mobile terminal for capturing biometric data of a user, where the mobile terminal is provided to the user by an issuing authority, comprising:

at least one hardware processor;

at least one sensor configured to capture the biometric data of the user;

an interface configured to transmit and receive data from a security document and an additional security document assigned to the user; and a non-transient data storage unit storing a credential and a program, the credential being assigned to the user by the issuing authority, the credential being stored in the non-transient data storage unit only following successful authentication of the user to a server of the issuing authority using a first set of authentication data, the credential being determined by the server using the first set of authentication data, the credential authorizing the mobile terminal to capture and store the biometric data of the user, the program including, an authentication module that, when executed by the at least one hardware processor, causes the at least one hardware processor to, authenticate the user to the mobile terminal based on authentication data assigned to the user, the authentication data assigned to the user being received from the additional security document via the interface, and authenticate the mobile terminal to the user based on the stored credential by sending the credential to the additional security document via the interface for testing by a processor of the additional security document, a control unit that, when executed by the at least one hardware processor, causes the at least one hardware processor to, capture the biometric data of the user via the at least one sensor only upon reciprocal successful authentication of the user and the mobile terminal, store the biometric data captured in the non-transient data storage unit in protected form only when the biometric data captured is authentic according to an authenticity test module, and perform a readout of the stored biometric data to the security document via the interface only in response to a successful authentication of an operator of the issuing authority by the authenticity test module, and the authenticity test module that, when executed by the at least one hardware processor, causes the at least one hardware processor to,
test an authenticity of the biometric data captured, and
authenticate the operator to the mobile terminal based on additional authentication data assigned to the operator,
wherein the authentication module, when executed by the at least one hardware processor, causes the at least one hardware processor to authenticate the user to the mobile terminal including,
executing a BAC protocol, an EAC protocol, a PACE-protocol or an SAC protocol between the mobile terminal and the additional security document, or
comparing a data value with a reference value stored in the mobile terminal, the data value being entered by the user into the mobile terminal or read out by the mobile terminal from the additional security document of the user.

2. The mobile terminal according to claim 1, wherein the at least one sensor includes one or more of:
a camera system configured to capture image data of a face or an iris,
a fingerprint sensor configured to capture fingerprint data,
a sensor configured to capture vein patterns in a hand,
a sensor configured to capture retina patterns,
a sensor configured to capture nailbed patterns,
a signature pad, or
a microphone configured to capture a voice profile.

3. The mobile terminal according to claim 1, wherein,
the program further includes a quality test module that, when executed by the at least one hardware processor, causes the at least one hardware processor to test a quality of the biometric data captured, and
the control unit, when executed by the at least one hardware processor, further causes the at least one hardware processor to store the biometric data captured only when the biometric data captured meets defined quality requirements.

4. The mobile terminal according to claim 1, further comprising:
at least one carrying handle;
a bottom part; and
a cover part,
wherein,
the at least one sensor includes,
a camera system that is attached to the inside of the cover part, or
a fingerprint sensor that is attached to the inside of the bottom part, or
the cover part includes a display device attached to the inside of the cover part, the display device being configured to display operating instructions to the user while the at least one sensor captures the biometric data.

5. The mobile terminal according to claim 1, further comprising:
a bottom part; and
a cover part including a semi-transparent mirror, the semi-transparent mirror being positioned between the user and a camera system such that a first path of light impinging on the semi-transparent mirror on a side of the semi-transparent mirror facing the user is parallel to a second path of the light reflected back by the semi-transparent mirror,
wherein the at least one sensor includes the camera system that is attached to an inside of the cover part, the camera system being configured to capture image data of a face or an iris of the user.

6. The mobile terminal according to claim 5, further comprising:
a first mirror configuration and a second mirror configuration mounted on a side of the semi-transparent mirror facing away from the user such that a third path of the light transmitted by the semi-transparent mirror impinges on the second mirror configuration, a fourth path of the light is directed onto the first mirror configuration by the second mirror configuration, and the first mirror configuration reflects a fifth path of the light onto the camera system, a position of a light inlet for the camera system being coupled to the position of the semi-transparent mirror.

7. The mobile terminal according to claim 6, wherein the first mirror configuration or the second mirror configuration is movable in a direction parallel to the fourth path of the light.

8. The mobile terminal according to claim 6, wherein the first mirror configuration and the second mirror configuration are coupled such that displacement of the second mirror configuration also displaces the first mirror configuration automatically such that an optical distance between the second mirror configuration and the light inlet of the camera system remains constant.

9. The mobile terminal according to claim 6, wherein the first mirror configuration is automatically displaceable when the second mirror configuration is at a constant position such that,
an optical distance between the face of the user and the light inlet of the camera system corresponds to a specified value, or
a size of a facial image captured by the camera system or an iris image of the user corresponds to a defined value.

10. The mobile terminal according to claim 6, further comprising:
an illumination mechanism configured to illuminate the user, the illumination mechanism being coupled to the first mirror configuration such that illumination behavior of the illumination mechanism is modified based on a displacement of the first mirror configuration.

11. The mobile terminal according to claim 10, wherein the camera system and the illumination mechanism are included in the cover part.

12. The mobile terminal according to claim 1, wherein the at least one sensor includes a camera system configured to capture image data of a face or an iris of the user, the mobile terminal further comprising:
a brightness sensor configured to measure ambient brightness; and
an illumination mechanism configured to illuminate the user,
wherein the program further includes computer readable instructions that, when executed by the at least one hardware processor, cause the at least one hardware processor to adjust a light intensity of the illumination mechanism or a light sensitivity of the camera system depending on the ambient brightness measured by the sensor.

13. The mobile terminal according to claim 1, wherein,
the program further includes a localization unit that, when executed by the at least one hardware processor, causes the at least one hardware processor to capture a current position of the mobile terminal while the biometric data is being captured;

the non-transient data storage unit further stores a geographic region determined by the issuing authority; and the control unit, when executed by the at least one hardware processor, further causes the at least one hardware processor to store the biometric data captured only when the current position of the mobile terminal is within the geographic region.

14. The mobile terminal according to claim 1, further comprising:

a clock configured to capture a current time while the biometric data is being captured, wherein, the non-transient data storage unit further stores an admissible period of time, a start time of the admissible period of time being determined by the issuing authority, and the control unit, when executed by the at least one hardware processor, further causes the at least one hardware processor to store the biometric data only when the current time is found to be within the admissible period of time.

15. A method for inserting biometric data of a user into a security document, comprising:

first authenticating the user to a server based on a first set of authentication data;

determining, by the server, a credential assigned to the user based on the first set of authentication data after successful completion of the first authenticating, the credential authorizing capture and storage of the biometric data of the user;

storing the credential in a mobile terminal, the mobile terminal including at least one sensor;

second authenticating the user to the mobile terminal based on the first set of authentication data or a second set of authentication data;

third authenticating the mobile terminal to the user based on the stored credential;

capturing, by the at least one sensor, the biometric data of the user based on successful completion of the second authenticating and the third authenticating;

testing an authenticity of the biometric data captured;

storing the biometric data captured in protected form only when the authenticity is authentic;

fourth authenticating an operator of an issuing authority to the mobile terminal based on a third set of authentication data assigned to the operator;

performing a readout of the stored biometric data to the security document only on successful completion of the fourth authenticating; and inserting the stored biometric data into the security document, wherein the second authenticating includes, executing a BAC protocol, an EAC protocol, a PACE-protocol or an SAC protocol between the mobile terminal and an additional security document, or comparing a data value with a reference value stored in the mobile terminal, the data value being entered by the user into the mobile terminal or read out by the mobile terminal from the additional security document of the user.

16. The method according to claim 15, wherein the first authenticating comprises:

inserting an additional security document assigned to the user into a reading device of a user computer, the additional security document storing the first set of authentication data in protected form;

sending, by the user computer to the server over a network, a request for providing a mobile terminal, the request containing a user identifier;

sending, by the server to an eID server, an authentication request containing the user identifier;

establishing a secure data transmission channel between the eID server and the additional security document;

testing, by the eID server, an authenticity and an integrity of the additional security document;

sending, by the eID server to the user computer, a confirmation of the authenticity and integrity;

reading out, by the eID server, the first set of authentication data; and sending, by the eID server to the server, the first set of authentication data to authenticate the user to the server, the mobile terminal being provided to the user only upon successful authentication of the user by the server.

17. The method according claim 15, wherein the credential includes an authorization certificate, and the third authenticating comprises:

sending the authorization certificate from the mobile terminal to an additional security document; and testing the authorization certificate by a processor of the additional security document.

18. The method according to claim 15, wherein an additional security document stores biometric reference data of the user, and the testing comprises:

reading out, by the mobile terminal, the biometric reference data from the additional security document;

comparing the biometric reference data read out with the biometric data captured;

outputting an indication that the biometric data is not authentic in response to the biometric data captured deviating from the biometric reference data by more than a defined value;

fifth authenticating the user to the additional security document based on a PIN input into data input interface of the mobile terminal;

sending a security document identifier to the mobile terminal after successful completion of the fifth authenticating, the security document identifier functioning as the second set of authentication data; and comparing the security document identifier with a reference value stored by the mobile terminal to authenticate the user to the mobile terminal.

19. The method according claim 15, further comprising:

sensing, by an additional security document, the second set of authentication data together with user metadata;

displaying, by a display device of the mobile terminal, the user metadata; and modifying the displayed user metadata based on input data received by the mobile terminal from the user via an input interface of the mobile terminal, wherein the storing the biometric data captured includes storing the modified user metadata, and the performing the readout of the stored biometric data includes reading out the modified user metadata to the security document.

20. A method for inserting biometric data of a user into a security document, comprising:

first authenticating the user to a server based on a first set of authentication data;

determining, by the server, a credential assigned to the user based on the first set of authentication data after successful completion of the first authenticating, the credential authorizing capture and storage of the biometric data of the user;

storing the credential in a mobile terminal, the mobile terminal including at least one sensor;

second authenticating the user to the mobile terminal based on the first set of authentication data or a second set of authentication data;

third authenticating the mobile terminal to the user based on the stored credential;

capturing, by the at least one sensor, the biometric data of the user based on successful completion of the second authenticating and the third authenticating;

testing an authenticity of the biometric data captured;

storing the biometric data captured in protected form only when the authenticity is authentic;

fourth authenticating an operator of an issuing authority to the mobile terminal based on a third set of authentication data assigned to the operator;

performing a readout of the stored biometric data to the security document only on successful completion of the fourth authenticating; and inserting the stored biometric data into the security document, wherein the credential includes an authorization certificate, and the third authenticating includes,
- sending the authorization certificate from the mobile terminal to an additional security document, and
- testing the authorization certificate by a processor of the additional security document.

* * * * *